(12) United States Patent
Naitou et al.

(10) Patent No.: US 12,345,322 B2
(45) Date of Patent: Jul. 1, 2025

(54) PLANETARY GEAR MECHANISM

(71) Applicant: KOMATSU LTD., Tokyo (JP)

(72) Inventors: Keita Naitou, Tokyo (JP); Tetsuya Yamauchi, Tokyo (JP); Yuta Yamauchi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/726,254

(22) PCT Filed: Feb. 1, 2023

(86) PCT No.: PCT/JP2023/003269
§ 371 (c)(1),
(2) Date: Jul. 2, 2024

(87) PCT Pub. No.: WO2023/176180
PCT Pub. Date: Sep. 21, 2023

(65) Prior Publication Data
US 2025/0067336 A1  Feb. 27, 2025

(30) Foreign Application Priority Data
Mar. 14, 2022  (JP) .................................. 2022-039346

(51) Int. Cl.
*F16H 57/04* (2010.01)
*F16H 1/28* (2006.01)
*F16H 57/08* (2006.01)

(52) U.S. Cl.
CPC ............ *F16H 57/0479* (2013.01); *F16H 1/28* (2013.01); *F16H 57/0482* (2013.01); *F16H 57/082* (2013.01)

(58) Field of Classification Search
CPC .... F16H 57/0479; F16H 1/28; F16H 57/0482; F16H 57/082

(Continued)

(56) References Cited

U.S. PATENT DOCUMENTS 5,171,195 A * 12/1992 Funamoto ................ F16H 1/46
74/DIG. 10
5,188,572 A *  2/1993 Yamaguchi ............... F16H 1/32
475/168

(Continued)

FOREIGN PATENT DOCUMENTS

| JP | 2011-112127 A | 6/2011 |
| JP | 2015-132315 A | 7/2015 |
| JP | 2019-138397 A | 8/2019 |

OTHER PUBLICATIONS

The International Search Report for the corresponding international application No. PCT/JP2023/003269, issued on Apr. 18, 2023.

*Primary Examiner* — Roger L Pang

(74) *Attorney, Agent, or Firm* — Global IP Counselors, LLP

(57) ABSTRACT

A planetary gear mechanism includes a plurality of planetary gears with helical teeth, a sun gear disposed inside the plurality of planetary gears to mesh with the plurality of planetary gears, a ring gear disposed outside the plurality of planetary gears to mesh with the plurality of planetary gears, a plurality of shafts rotatably supporting the plurality of planetary gears, a first support wall supporting first ends of the plurality of shafts, a second support wall supporting second ends opposite to the first ends of the plurality of shafts, and a plurality of connecting sections arranged between the planetary gears adjacent in a circumferential direction. The second support wall is disposed opposite to the first support wall. The plurality of connecting sections connect the first support wall and the second support wall. Each connecting section includes first and second end portions connected to the first and second support walls.

6 Claims, 14 Drawing Sheets

(58) Field of Classification Search
USPC .................................................. 475/159, 331
See application file for complete search history.

(56) References Cited

U.S. PATENT DOCUMENTS

| | | | | |
|---|---|---|---|---|
| 5,498,215 | A | * | 3/1996 | Hosokawa ................ F16H 1/32 475/168 |
| 5,713,813 | A | * | 2/1998 | von Greyerz ............. F16H 3/74 475/296 |
| 5,863,272 | A | * | 1/1999 | Anderson ............. F16H 57/082 475/331 |
| 5,937,701 | A | * | 8/1999 | Mimura .................. F16H 29/14 475/329 |
| 6,129,648 | A | * | 10/2000 | Tanioka .................... F16H 1/46 475/342 |
| 2005/0026744 | A1 | * | 2/2005 | Illerhaus ............... F16H 57/082 475/331 |
| 2012/0046139 | A1 | * | 2/2012 | Floren ................ F16H 57/0486 475/159 |
| 2013/0337968 | A1 | * | 12/2013 | Kleine-Brockhoff ....................... F03D 15/00 475/331 |
| 2019/0249764 | A1 | | 8/2019 | Ono et al. |

\* cited by examiner

PLANETARY GEAR MECHANISM

CROSS-REFERENCE TO RELATED APPLICATIONS

This application is a U.S. National stage application of International Application No. PCT/JP2023/003269, filed on Feb. 1, 2023. This U.S. National stage application claims priority under 35 U.S.C. § 119 (a) to Japanese Patent Application No. 2022-039346, filed in Japan on Mar. 14, 2022, the entire contents of which are hereby incorporated herein by reference.

BACKGROUND

Technical Field

The claimed invention relates to a planetary gear mechanism.

Background Information

In recent years, high-speed rotation has been required for planetary gear mechanisms used in transmissions and the like, as the needs for electrification increase. From the perspective of reducing the noise caused by high-speed rotation and enhancing the transmission torque, helical-teeth gears are used in such a planetary gear mechanism. The planetary gear mechanism includes a sun gear, a plurality of planetary gears arranged around the sun gear, and a ring gear arranged around the plurality of planetary gears, and the plurality of planetary gears are supported by a planetary carrier (See Patent Document 1.) In the planetary gear mechanism disclosed in Japanese Patent Application Publication No. 2011-112127, lubricating oil is supplied to lubricate the tooth surfaces of helical teeth, and the lubricating oil flows along the rotation axis as the gear rotates.

SUMMARY

When a helical-teeth planetary gear mechanism is adopted to meet the needs for electrification, however, lubricating oil flows along the rotation axis and is biased in one direction, causing difficulty for the lubricating oil to be discharged between the tooth surfaces of the planetary gears and the planetary carrier. Accordingly, rotation loss occurs due to the lubricating oil. In order to facilitate the discharge of lubricating oil, the distance between the planetary carrier and the tooth surface of the planetary gears might be increased. However, if the distance is increased, it becomes difficult to ensure the strength to transmit torque.

An object of the present disclosure is to provide a planetary gear mechanism that allows lubricating oil to be easily discharged while ensuring the strength of the mechanism.

A planetary gear mechanism of the first aspect according to the present disclosure includes a plurality of planetary gears, a sun gear, a ring gear, a plurality of shafts, a first support wall, a second support wall, and a plurality of connecting sections. The plurality of planetary gears each have helical teeth. The sun gear is placed inside the plurality of planetary gears to be in mesh with the plurality of planetary gears. The ring gear is placed outside the plurality of planetary gears to be in mesh with the plurality of planetary gears. The plurality of shafts rotatably supports the plurality of planetary gears. The first support wall supports first ends of the plurality of shafts. The second support wall supports second ends opposite to the first ends of the plurality of shafts, the second support wall being disposed opposite to the first support wall. The plurality of connecting sections is arranged between the planetary gears adjacent in a circumferential direction, and connects the first support wall and the second support wall. The connecting sections each include a first end portion that is connected to the first support wall and a second end portion that is connected to the second support wall. The connecting sections are arranged such that a distance between the connecting sections and the planetary gears disposed to a first-circumferential-direction side of the connecting sections in the circumferential direction is wider on a side of the first end portions than on a side of the second end portions.

A planetary gear mechanism of a second aspect according to the present disclosure includes a plurality of planetary gears, a sun gear, a ring gear, a plurality of shafts, a first support wall, a second support wall, and a plurality of connecting sections. The plurality of planetary gears each have helical teeth. The sun gear is placed inside the plurality of planetary gears to be in mesh with the plurality of planetary gears. The ring gear is placed outside the plurality of planetary gears to be in mesh with the plurality of planetary gears. The plurality of shafts rotatably supports the plurality of planetary gears. The first support wall supports first ends of the plurality of shafts. The second support wall supports second ends opposite to the first ends of the plurality of shafts, the second support wall being disposed opposite to the first support wall. The plurality of connecting sections is arranged between planetary gears adjacent in a circumferential direction and connects the first support wall and the second support wall. The connecting sections each have a first end portion that is connected to the first support wall and a second end portion that is connected to the second support wall. The first end portions of the connecting sections are arranged such that a distance between the first end portions and the planetary gears disposed to a first-circumferential-direction side of the connecting sections in the circumferential direction is wider than a distance between the first end portions and the planetary gears disposed to a second-circumferential-direction side of the connecting sections. The second-circumferential-direction side is opposite to the first-circumferential-direction side.

According to present disclosure, a planetary gear mechanism can be provided that allows lubricating oil to be easily discharged while ensuring the strength of the mechanism.

DETAILED DESCRIPTION OF EMBODIMENT(S)

A lubrication system including a planetary gear mechanism according to an embodiment of the present disclosure will be described with reference to the drawings. The planetary gear mechanism of the present embodiment is used, for example, in a drive system of a work machine.
(Structure)
(Outline of Driving System 2 of Work Machine 1)

Figure 1:
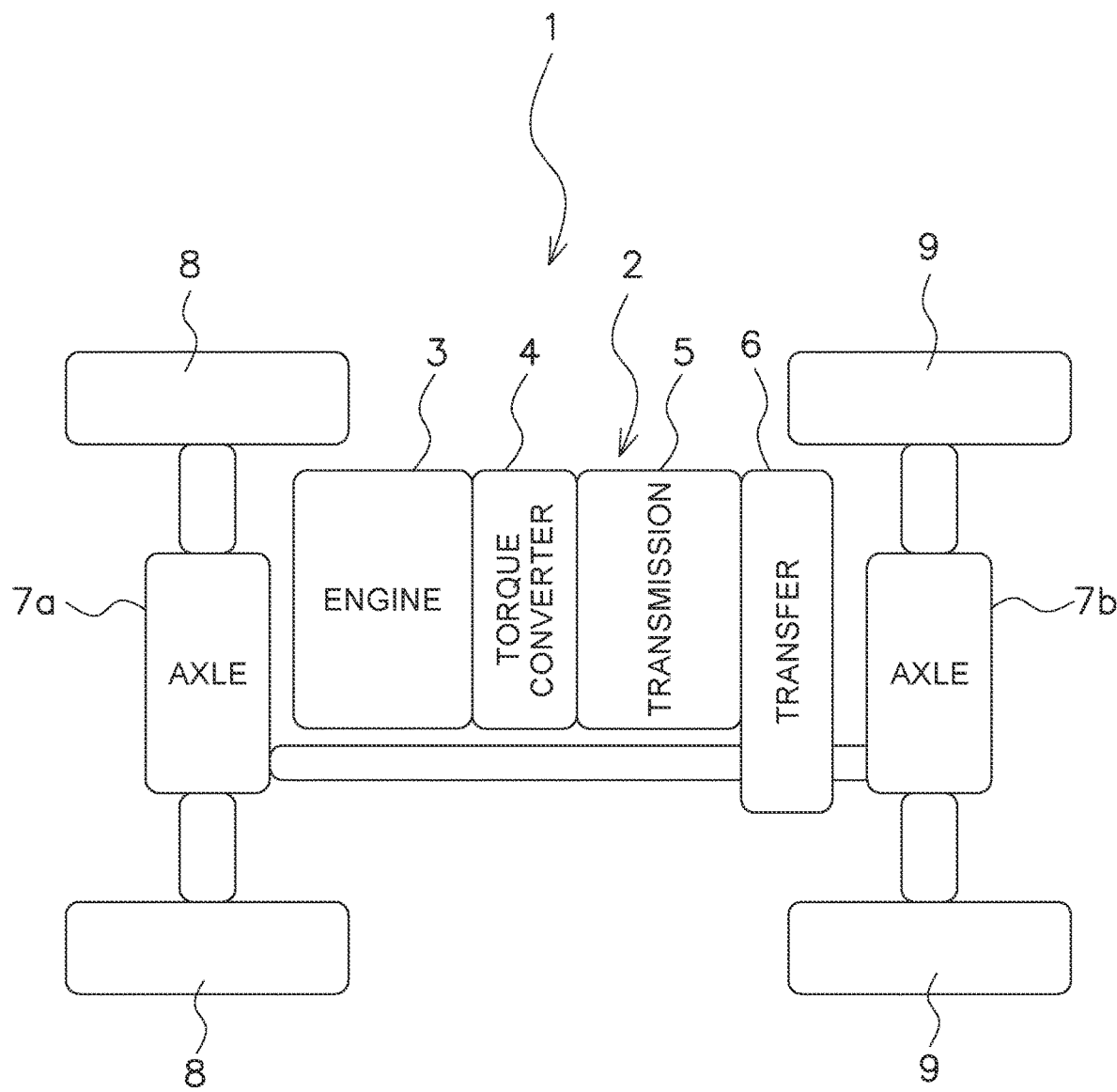
FIG. 1 is a schematic diagram showing a drive system of a work machine according to an embodiment of the present disclosure.

FIG. 1 is a schematic diagram showing a drive system 2 of a work machine 1. The drive system 2 of the work machine 1 includes an engine 3, a torque converter 4, a transmission 5, a transfer 6, axles 7a, 7b, a pair of front tires 8, and a pair of rear tires 9. The engine 3 is, for example, a diesel engine. The driving force generated by the engine 3 is transmitted to the torque converter 4. The torque converter 4 transmits the driving force generated by engine 3 to the transmission 5.

The transmission 5 decelerates the driving force transmitted from the engine 3 via torque converter 4, and transmits it to the transfer 6. The planetary gear mechanism 11 of the present embodiment, which will be described later, is used as a reducer of the transmission 5, for example.

The transfer 6 distributes the driving force transmitted from the transmission 5 to the front and rear axles 7a and 7b. The pair of front tires 8 are connected to the front axle 7a. The pair of front tires 8 are rotated by the power from the engine 3 distributed to the front axle 7a. The pair of rear tires 9 are connected to the rear axle 7b. The pair of rear tires 9 are rotated by the power from the engine 3 distributed to the rear axle 7b.

Figure 2:
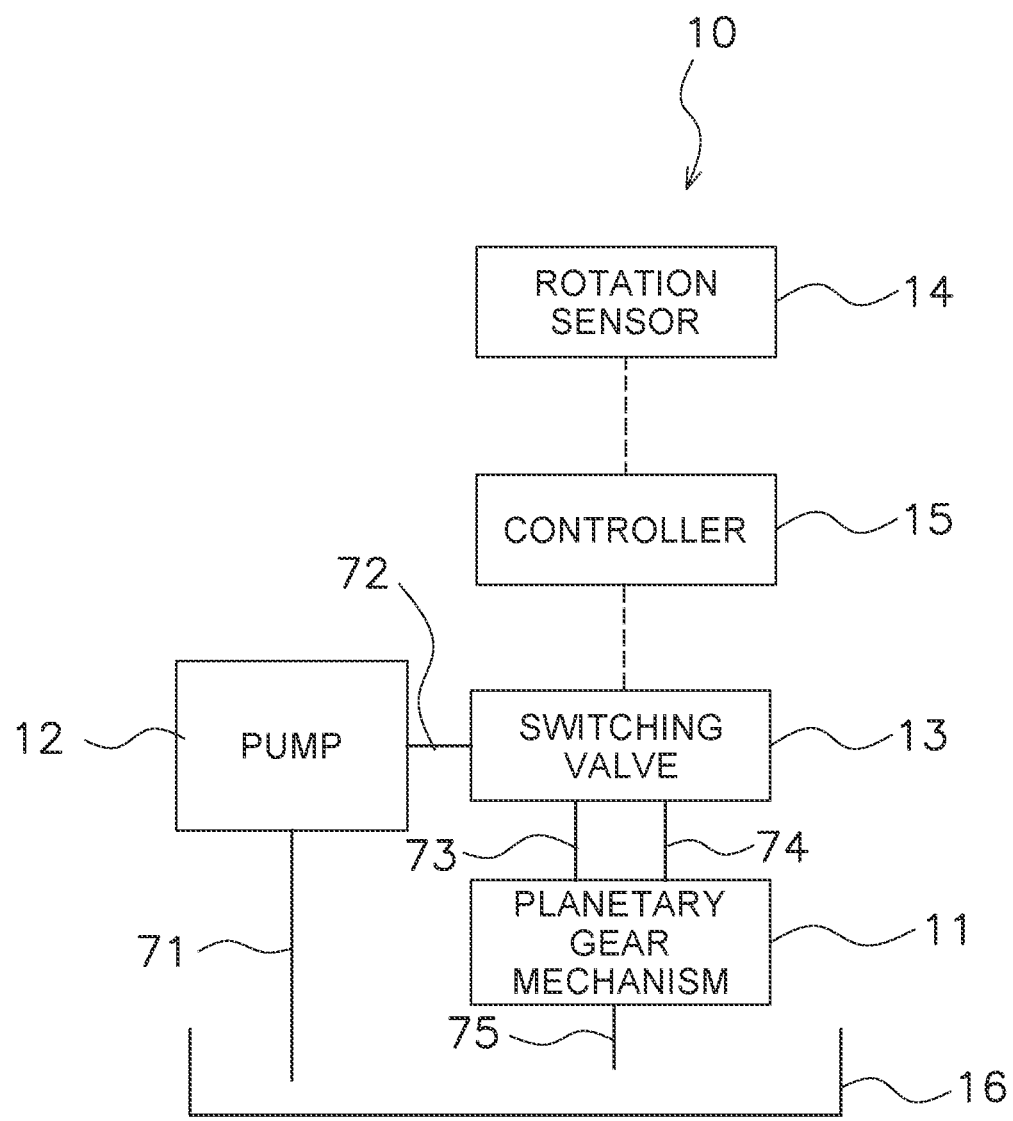
FIG. 2 is a block diagram showing a lubrication system according to the embodiment of the present disclosure.

The work machine 1 is equipped with a lubrication system 10 for lubricating the gears of a planetary gear mechanism 11. FIG. 2 is a block diagram showing a structure of the lubrication system 10. The lubrication system 10 includes a planetary gear mechanism 11, a pump 12, a switching valve 13, a rotation sensor 14, and a controller 15.

The pump 12 supplies lubricating oil to the planetary gear mechanism 11 from a tank 16 that stores lubricating oil. As will be described in detail later, the planetary gear mechanism 11 includes a plurality of supply paths for supplying lubricating oil to the gears. The switching valve 13 switches the supply of lubricating oil between the plurality of supply paths. The rotation sensor 14 detects information to determine the rotation directions of the gears. The controller 15 controls the pump 12 and the switching valve 13. The controller 15 controls the switching valve 13 based on the information detected by the rotation sensor 14.

(Planetary Gear Mechanism 11)

Figure 3:
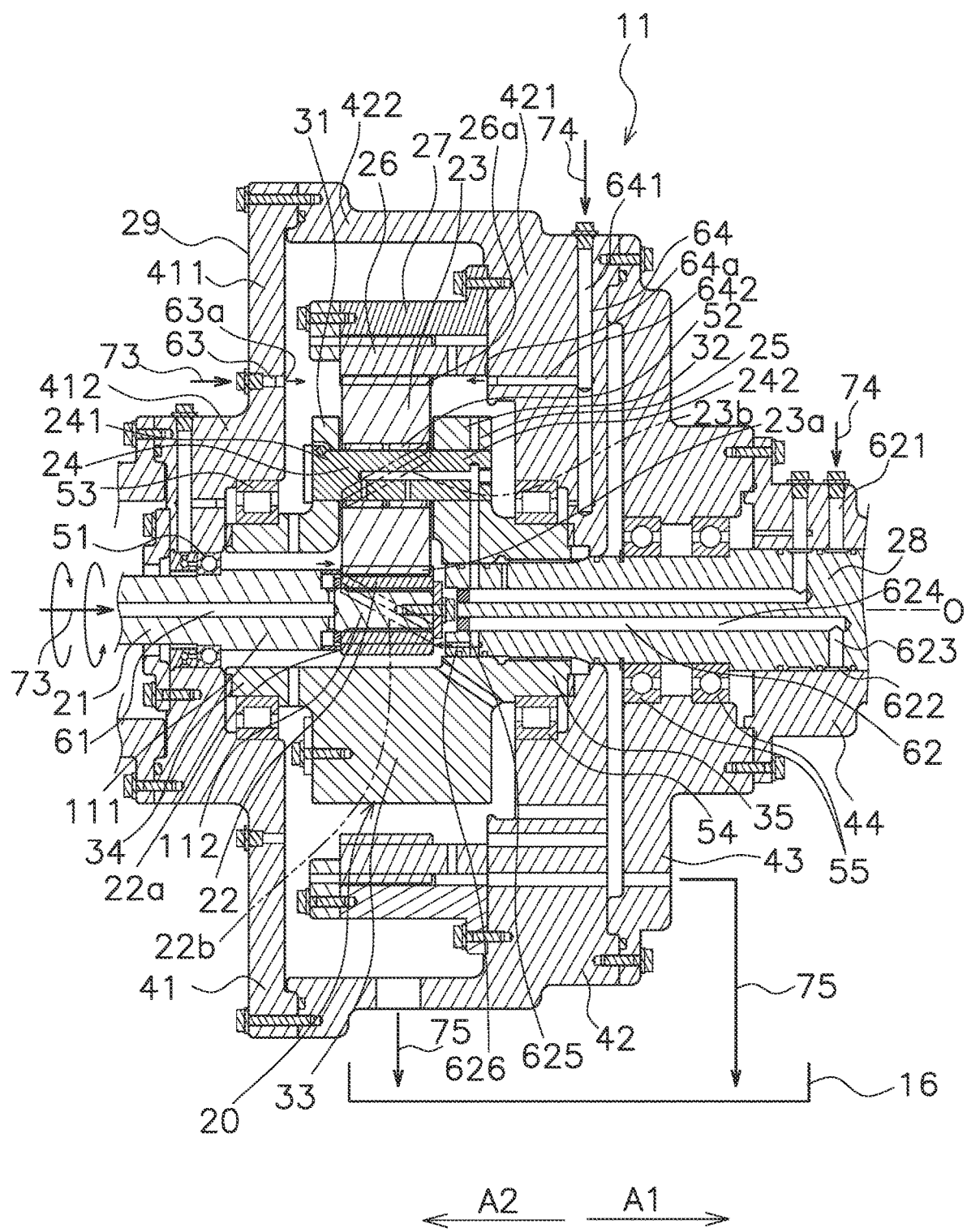
FIG. 3 is a cross-sectional diagram showing a planetary gear mechanism according to the embodiment of the present disclosure.

FIG. 3 is a cross-sectional diagram showing the planetary gear mechanism 11 of the present embodiment.

The planetary gear mechanism 11 includes an input shaft 21, a sun gear 22, a planetary gear unit 20, a ring gear 26, a fixing member 27, an output shaft 28, and a housing 29.

Figure 4:
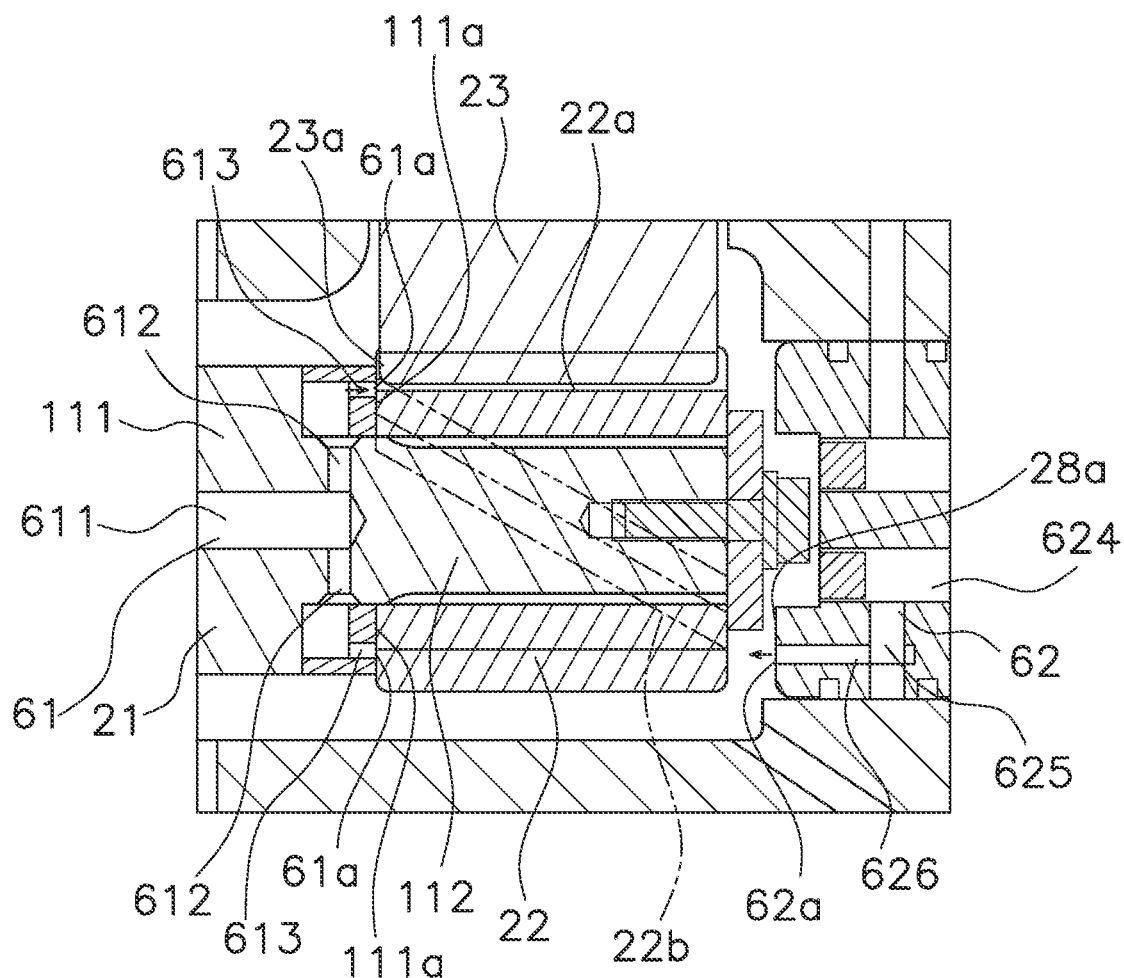
FIG. 4 is an enlarged diagram showing a sun gear and the vicinity thereof in FIG. 3.

Power is input to the input shaft 21. In FIG. 1, the power from the engine 3 is input via the torque converter 4. The input shaft 21 is a cylindrical member. The input shaft 21 is positioned in the housing 29. The input shaft 21 is rotatably supported with respect to the housing 29 by a bearing 51 that is arranged on the housing 29. In FIG. 3, the central axis of the input shaft 21 is shown as the line O. The input shaft 21 is arranged coaxially with the output shaft 28 which will be described later. Among the directions parallel to the central axis O, the direction extending from the input shaft 21 toward the output shaft 28 is defined as a first direction A1, and the direction extending from the output shaft 28 toward the input shaft 21 and opposite to the first direction A1 is defined as a second direction A2. The input shaft 21 includes a main body 111 and an end portion 112. The end portion 112 is located at the end of the main body 111 in the first direction A1. FIG. 4 is an enlarged view showing the sun gear 22 and the vicinity thereof. The end portion 112 is formed to be smaller than the outer diameter of the main body 111. The main body 111 and the end portion 112 form a step therebetween. At the step portion, the main body 111 has an end surface 111a that is perpendicular to the central axis O.

The sun gear 22 is fixed to the tip of the input shaft 21. The sun gear 22 is arranged coaxially with the input shaft 21. The sun gear 22 is disposed around the end portion 112, which is disposed within the housing 29, of the input shaft 21. The sun gear 22 rotates about the axis O together with the input shaft 21. The sun gear 22 is a helical-tooth gear. The sun gear 22 includes a tooth surface 22a that has helical teeth 22b. The helical teeth 22b of the sun gear 22 are indicated by two-dot chain lines in FIGS. 3 and 4. The helical teeth 22b are arranged at an angle to the axis O.

Figure 5:
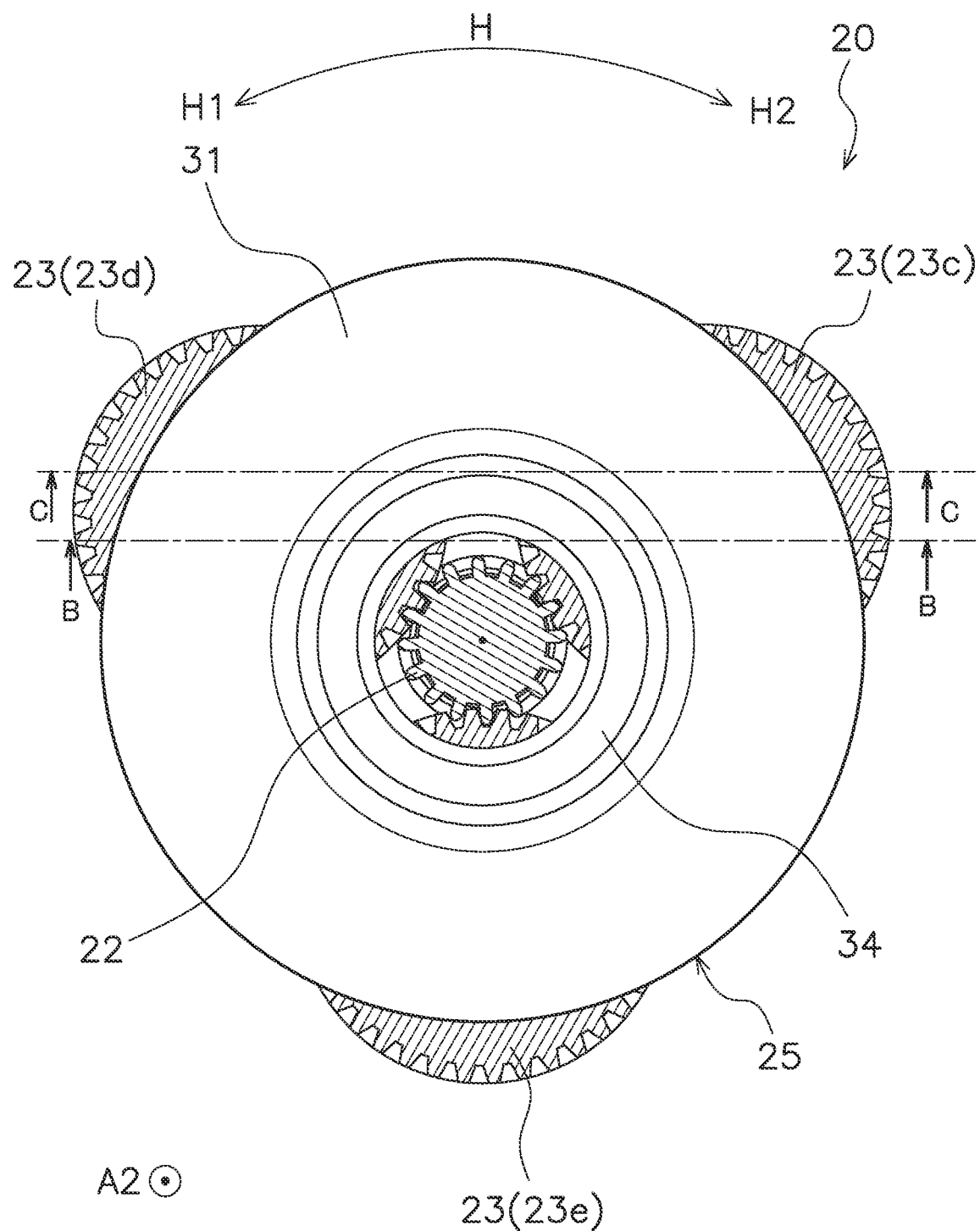
FIG. 5 is a front diagram of a planetary gear unit, as seen along its axis, according to the embodiment of the present disclosure.
Figure 6:
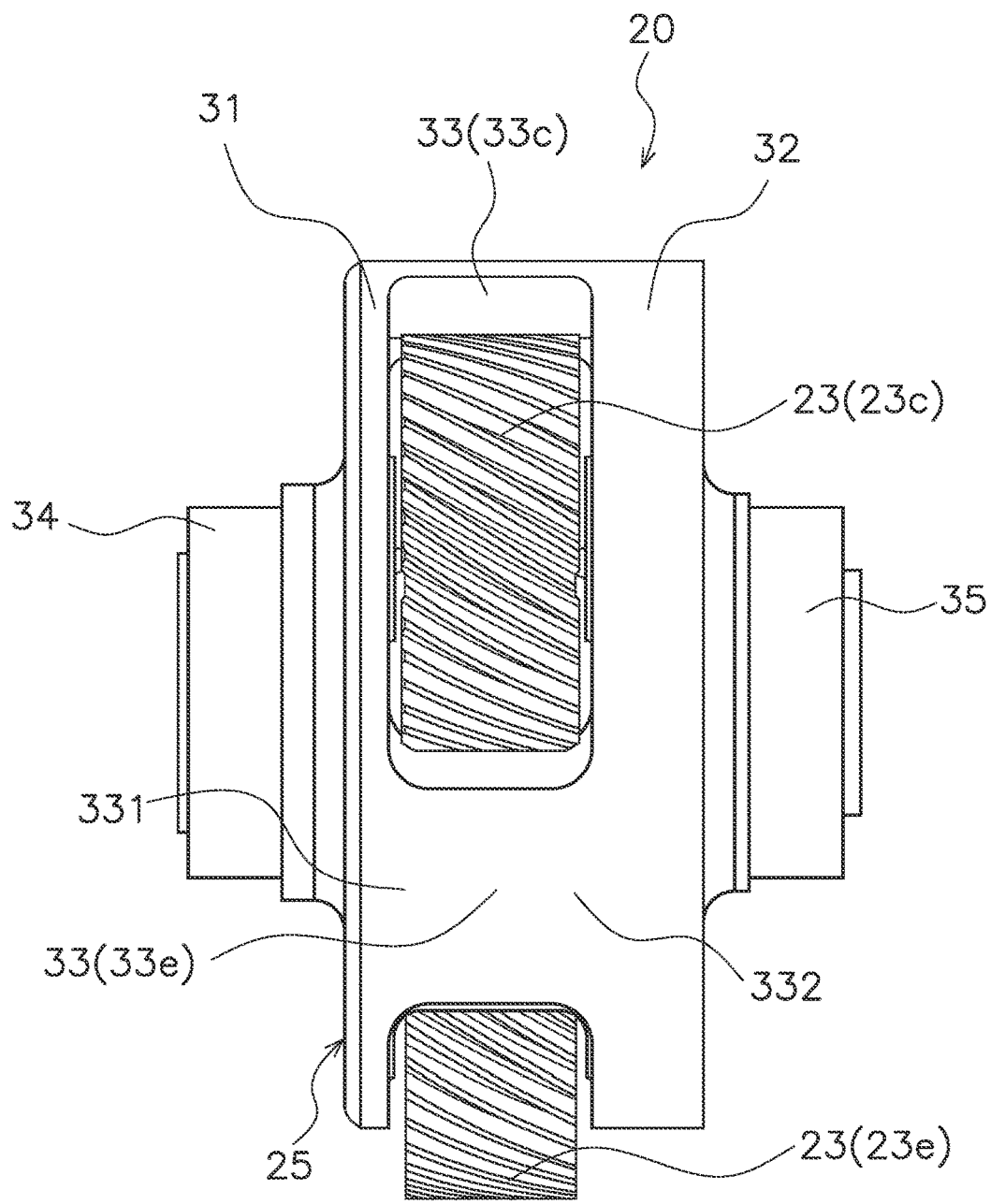
FIG. 6 is a side view of a planetary gear unit, viewed from the direction perpendicular to the axis, according to the embodiment of the present disclosure.
Figure 7:
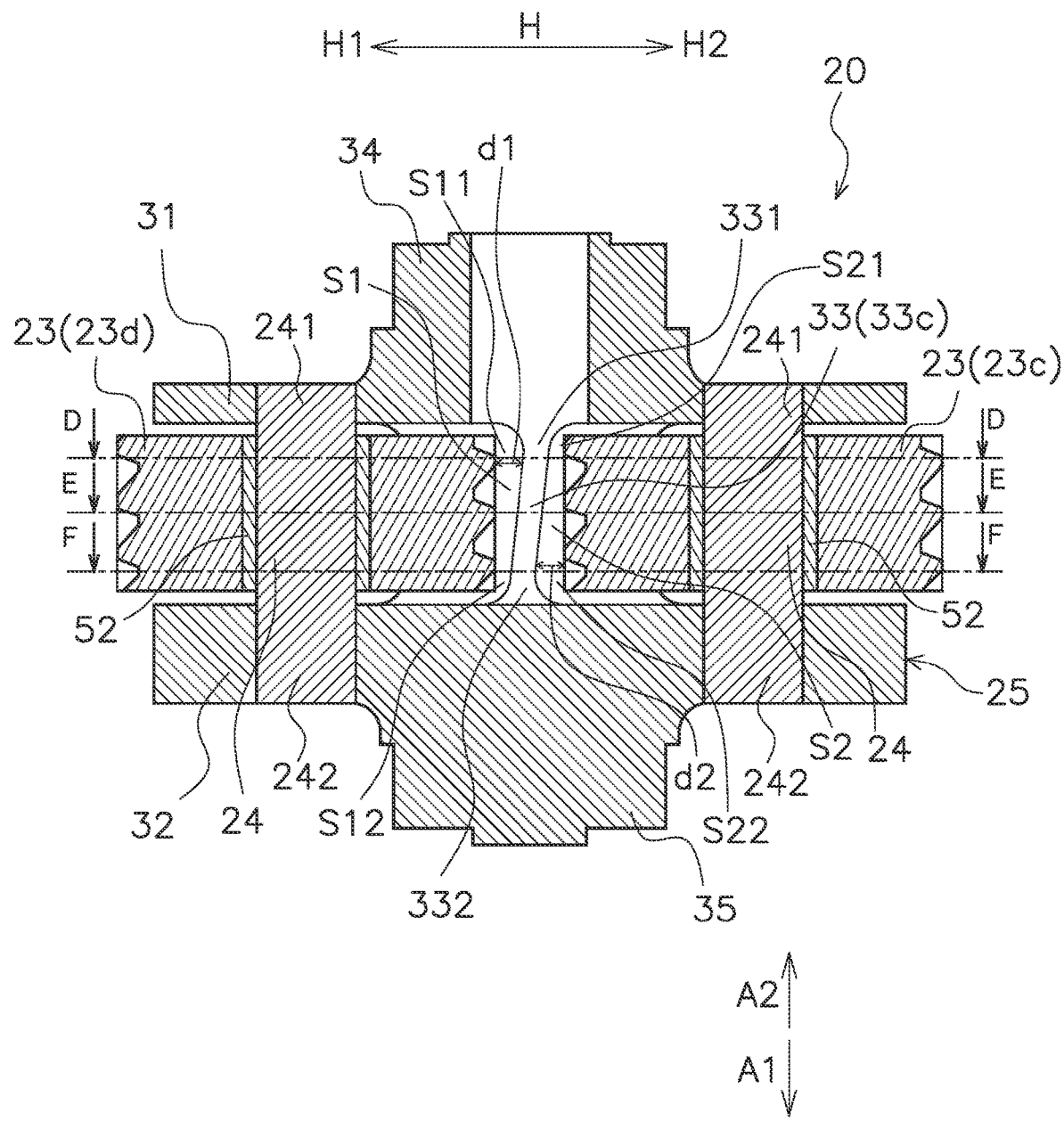
FIG. 7 is a cross-sectional view of the planetary gear unit in the direction of arrows between BB in FIG. 5.
Figure 8:
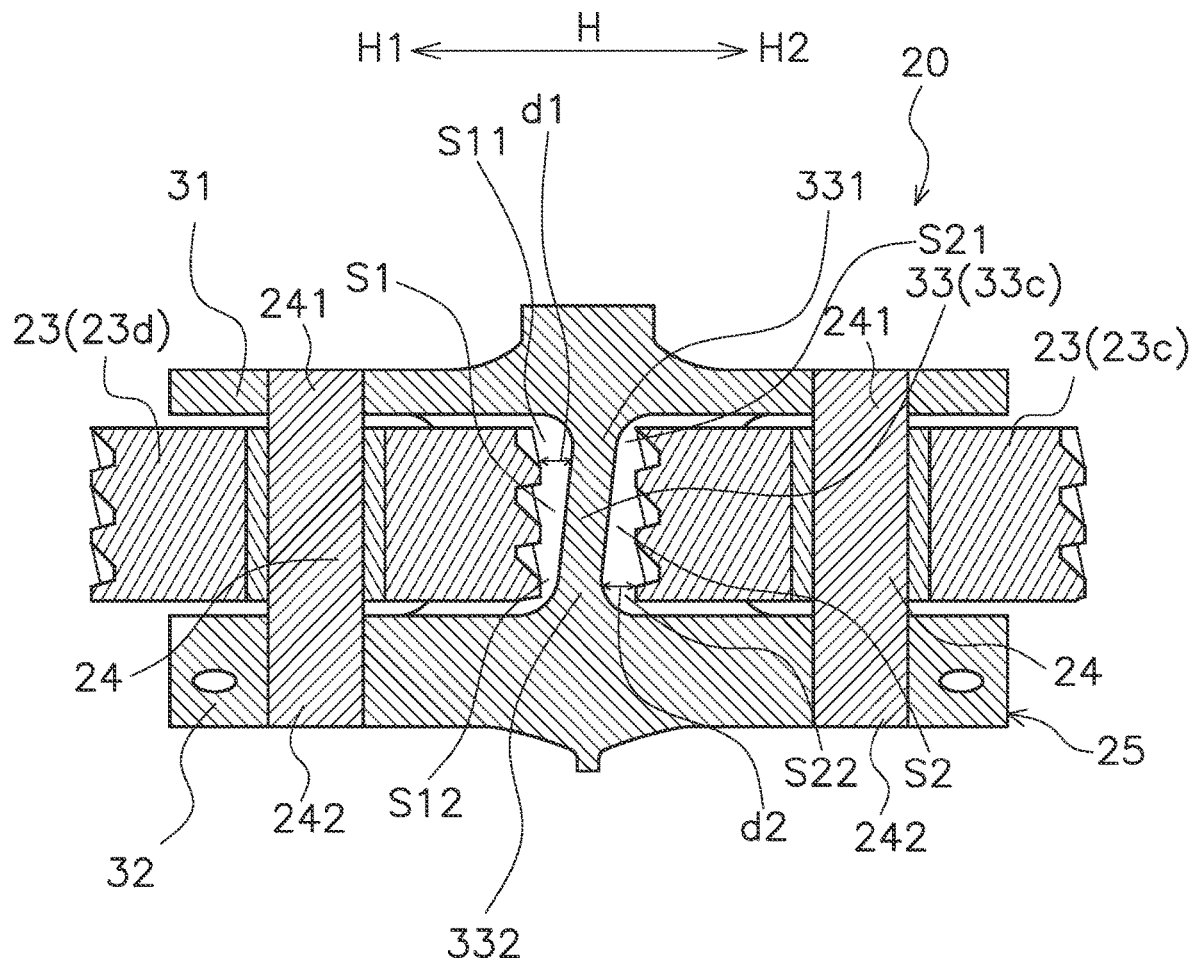
FIG. 8 is a cross-sectional view of the planetary gear unit in the direction of arrows between CC in FIG. 5.
Figure 9:
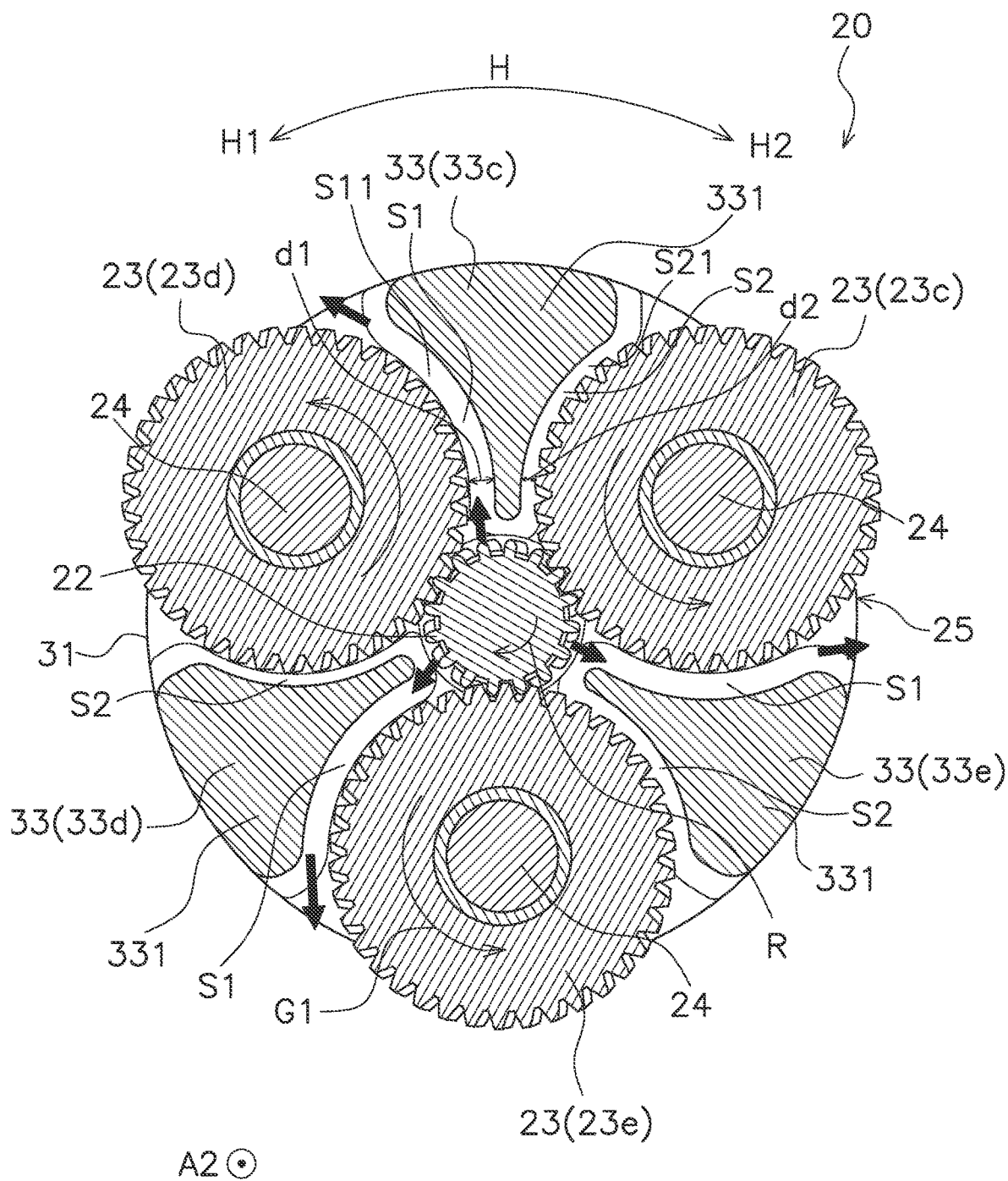
FIG. 9 is a cross-sectional view of the planetary gear unit in the direction of arrows between DD in FIG. 7.
Figure 10:
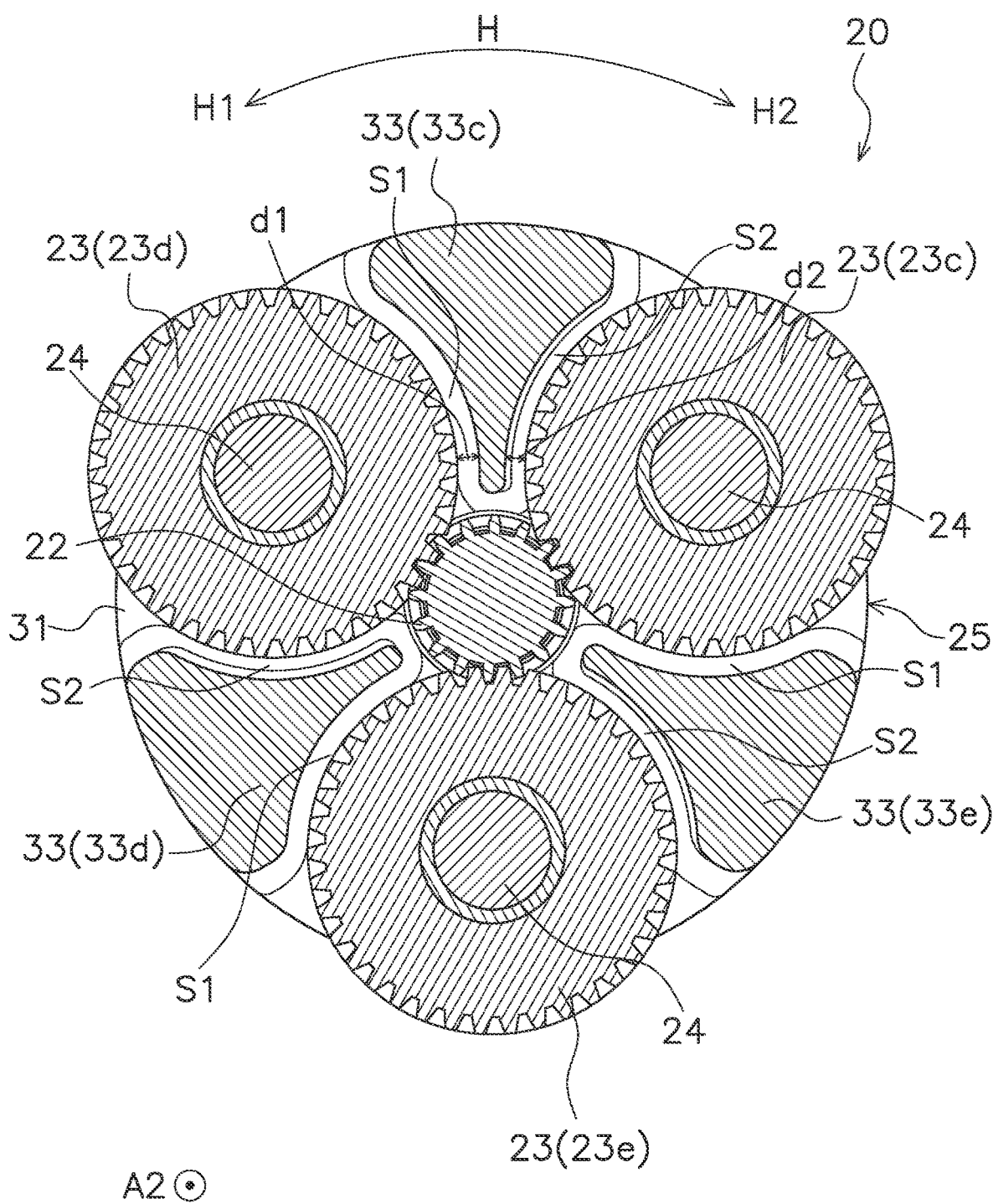
FIG. 10 is a cross-sectional view of the planetary gear unit in the direction of arrows between EE in FIG. 7.
Figure 11:
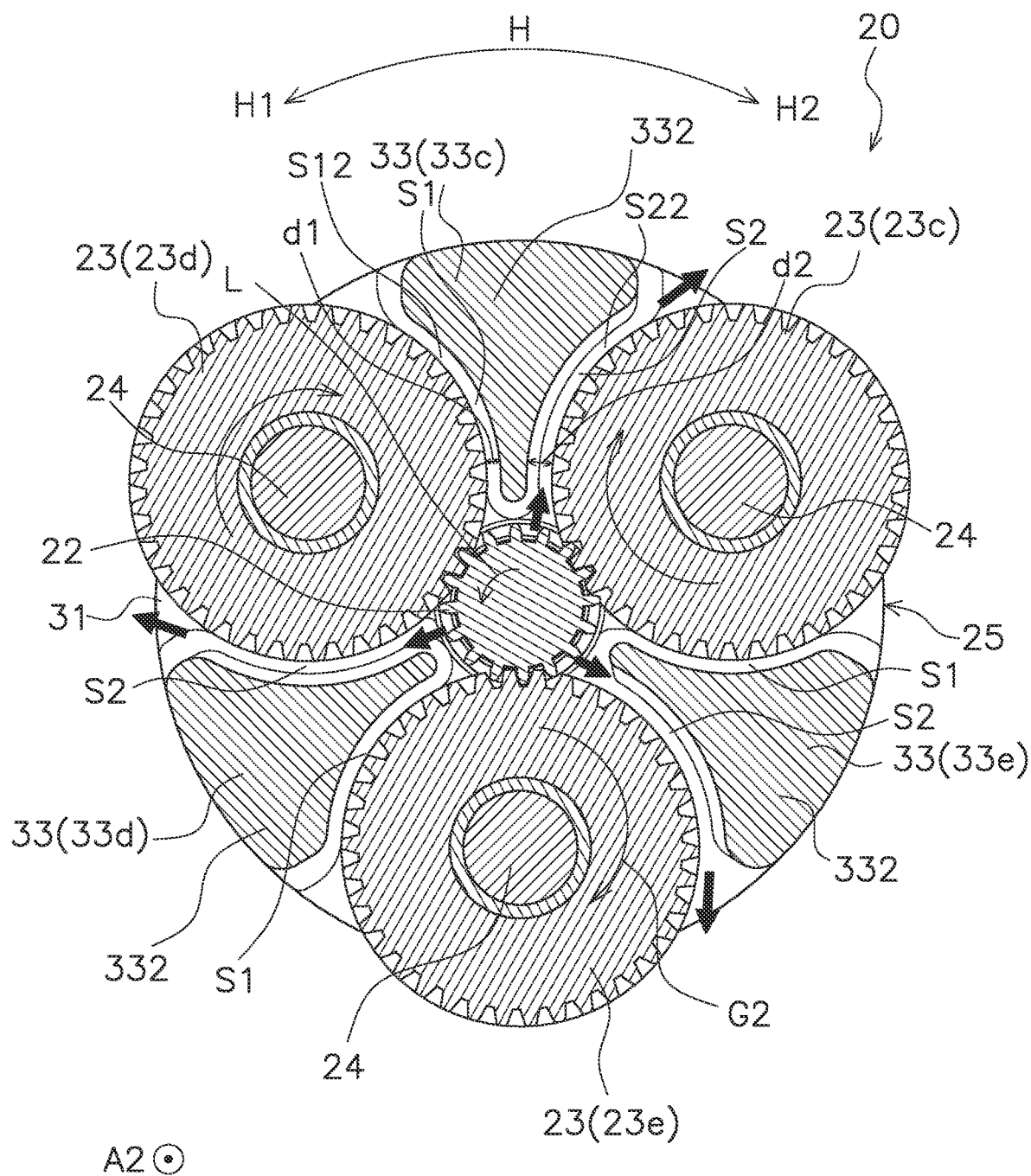
FIG. 11 is a cross-sectional view of the planetary gear unit in the direction of arrows between FF in FIG. 7.

As shown in FIG. 3, the planetary gear unit 20 is arranged so as to cover the outside of the sun gear 22. FIG. 5 is a front view of the planetary gear unit 20 as seen along the axis O from the side of the direction A1. FIG. 6 is a side view of the planetary gear unit 20. FIG. 7 is a cross-sectional view of the planetary gear unit 20 in the direction of arrows between BB in FIG. 5. FIG. 8 is a cross-sectional view of the planetary gear unit 20 in the direction of arrows between CC in FIG. 5. FIG. 9 is a cross-sectional view of the planetary gear unit 20 in the direction of arrows between DD in FIG. 7. FIG. 10 is a cross-sectional view of the planetary gear unit 20 in the direction of arrows between EE in FIG. 7. FIG. 11 is a cross-sectional view of the planetary gear unit 20 in the direction of arrows between FF in FIG. 7.

As shown in FIGS. 5 and 6, the planetary gear unit 20 includes a plurality of planetary gears 23, pinion shafts 24 (see FIG. 7), and a planetary carrier 25. The plurality of planetary gears 23 of the planetary gear unit 20 is arranged to the outer periphery side of the sun gear 22 to be in mesh with the sun gear 22.

In the present embodiment, three planetary gears 23 are mounted, as shown in FIG. 5. The planetary gears 23 are each a helical-tooth gear. As shown in FIG. 3, the planetary gears 23 each include a tooth surface 23a that has helical teeth 23b. The helical teeth 23b of the planetary gears 23 are indicated by two-dot chain lines in FIG. 3. The helical teeth 23b are arranged at an angle to the axis O. The planetary gears 23 are rotatably supported by the pinion shafts 24. The planetary gears 23 rotate around a direction parallel to the axis O.

As shown in FIGS. 7 and 8, the pinion shafts 24 are each set in the center of each planetary gear 23. A bearing 52 is arranged around each pinion shaft 24. planetary gears 23 are arranged around the bearings 52. The bearings 52 allow the planetary gears 23 to rotate against the pinion shafts 24. As shown in FIG. 9, the pinion shaft 24 is provided for each planetary gear 23. In the present embodiment, three pinion shafts 24 are provided to the three planetary gears 23, respectively.

The planetary carrier 25 supports the plurality of pinion shafts 24. The plurality of pinion shafts 24 are fixed to the planetary carrier 25, as shown in FIGS. 7 and 8. As shown in FIG. 6, the planetary carrier 25 includes a first carrier disk 31 (an example of the first support wall), a second carrier disk 32 (an example of the second support wall), and plural carrier columns 33 (an example of the connecting sections), a first carrier boss 34, and a second carrier boss 35.

The first carrier disk 31 has a disk shape. As shown in FIG. 7, first ends 241 of the plurality of pinion shafts 24 (the ends in the second direction A2) are fixed to the first carrier disk 31. The first carrier disk 31 is disposed to the second-direction A2 side of the plurality of planetary gears 23. The first carrier disk 31 has a through-hole therethrough along the central axis O, and the input shaft 21 is positioned in the through-hole.

The second carrier disk 32 has a disk shape. Second ends 242 of the plurality of pinion shafts 24 (the ends in the first direction A1) are fixed to the second carrier disk 32. The second carrier disk 32 is arranged to the first-direction A1 side of the plurality of planetary gears 23. The second carrier disk 32 has a through-hole therethrough along the central axis O, and the output shaft 28 is positioned in the through-hole.

As shown in FIGS. 7 and 8, the plurality of carrier columns 33 are arranged between the first carrier disk 31 and the second carrier disk 32. The plurality of carrier columns 33 connect between the first carrier disk 31 and the second carrier disk 32. The carrier columns 33 are arranged between the planetary gears 23 in a circumferential direction H.

The carrier columns 33 are arranged between adjacent planetary gears 23, as shown in FIGS. 9 to 11. As shown in FIGS. 7 and 8, the carrier columns 33 each have a first end portion 331 that is connected to the first carrier disk 31 and a second end portion 332 that is connected to the second carrier disk 32.

Here, when distinguishing between the plurality of planetary gears 23 for describing, the upper-right planetary gear 23 shown in FIG. 9 is referred to as 23c, the upper-left planetary gear 23 is referred to as 23d, and the lower planetary gear 23 is referred to as 23e. Note that, in the drawings, the 23c, 23d, and 23e are shown in parentheses after the symbols 23, respectively.

Also, when distinguishing between the plurality of carrier columns 33 for describing, as shown in FIG. 9, the carrier column 33 between planetary gear 23c and planetary gear 23d is referred to as 33c, the carrier column 33 between the planetary gear 23d and the planetary gear 23e is referred to as 33d, and the carrier column 33 between the planetary gears 23e and 23c is referred to as 33e. Note that, in the drawings, the 33c, 33d, and 33e are shown in parentheses after the symbols 33, respectively.

In the rotation directions of the planetary gears 23 when viewed along the first direction A1, the left-hand rotation direction is indicated by an arrow G1 (see FIG. 9), and the right-hand rotation direction is indicated by an arrow G2 (see FIG. 11). As shown in FIG. 9, in the circumferential direction H around the axis O, the left-circumferential direction is indicated by an arrow H1, and the right-circumferential-direction is indicated by an arrow H2. In the rotation directions of the sun gear 22, the left-hand rotation direction is indicated by an arrow L (see FIG. 11), and the right-hand rotation direction is indicated by an arrow R (see FIG. 9).

The shapes of the carrier column 33c, the carrier column 33d, and the carrier column 33e each have rotational symmetry about the axis O. Therefore, the shapes of the carrier columns 33 will be described using the carrier column 33c as an example.

As shown in FIGS. 7 to 11, the carrier column 33c is formed to extend radially outward from the center O along the outer edges of the planetary gears 23 on both sides in the circumferential direction. A flow path S1 with a predetermined distance d1 is formed between the carrier column 33c and the planetary gear 23d arranged to the left-circumferential-direction H1 side of the carrier column 33c. A flow path S2 with a predetermined distance d2 is formed between the carrier column 33c and the planetary gear 23c arranged to the right-circumferential-direction H2 side of the carrier column 33c. As will be described in detail later, lubricating oil is discharged to the outside of the planetary gear unit 20 through the flow path S1 or the flow path S2.

The carrier column 33c is configured at an angle to the axis O, as shown in FIGS. 7 and 8. In the circumferential direction, the first end portion 331 of the carrier column 33c is located to the right-circumferential-direction H2 side of the second end portion 332.

As shown in FIGS. 7 and 8, the carrier column 33c is gradually separated away from the planetary gear 23d, in the direction from the second end portion 332 toward the first end portion 331. The flow path S1 is formed such that the distance d1 gradually increases in the direction from the second end portion 332 toward the first end portion 331. In the flow path S1, the portion on the side of the first end portion 331 is shown as a flow path portion S11, and the portion on the side of the second end portion 332 is shown as a flow path portion S12. The carrier columns 33 are formed such that the distance d1 is wider in the flow path portion S11 than in the flow path portion S12.

The carrier column 33c is gradually separated away from the planetary gear 23c, in the direction from the first end portion 331 toward the second end portion 332. The flow path S2 is formed such that the distance d2 gradually increases, in the direction from the first end portion 331 toward the second end portion 332. In the flow path S2, the portion on the side of the first end portion 331 is shown as a flow path portion S21, and the portion on the side of the second end portion 332 is shown as a flow path portion S22. The carrier columns 33 are formed such that the distance d2 is wider in the flow path portion S22 than in the flow path portion S21.

The position of the DD cross-section in FIG. 7 shows where the carrier column 33 is cut on the side of the first end portion 331. Accordingly, FIG. 9 shows a cross-section of the carrier column 33 on the side of the first end portion 331.

As shown in FIG. 9, the distance d1 of the flow path S1 is wider than the distance d2 of the flow path S2 in the DD cross-section.

The position of the EE cross-section in FIG. 7 shows where the carrier column 33 is cut centrally. Accordingly, FIG. 10 shows a cross-section in the middle of the carrier column 33. As shown in FIG. 10, the distance d1 of the flow path S1 is equal to the distance d2 of the flow path S2 in the EE cross-section.

The position of the FF cross-section in FIG. 7 shows where the carrier column 33 is cut on the side of the second end portion 332. Accordingly, FIG. 11 shows a cross-section of the carrier column 33 on the side of the second end portion 332. As shown in FIG. 11, the distance d2 of the flow path S2 is wider than the distance d1 of the flow path S1 in the FF cross-section.

Note that, as described above, the carrier column 33d has a shape obtained by rotating the carrier column 33c by 120 degrees in the left circumferential direction H1 about the axis O. Further, the carrier column 33e has a shape obtained by rotating the carrier column 33c by 240 degrees in the left circumferential direction H1 about the axis O.

As shown in FIG. 6, the first carrier boss 34 protrudes from the first carrier disk 31 in the second direction A2. As shown in FIG. 3, the input shaft 21 is positioned in the first carrier boss 34.

As shown in FIG. 6, the second carrier boss 35 protrudes from the second carrier disk 32 in the first direction A1. As shown in FIG. 3, the output shaft 28 is positioned in the second carrier boss 35.

The first carrier boss 34 is rotatably supported by the housing 29 via a bearing 53. The second carrier boss 35 is rotatably supported by the housing 29 via a bearing 54.

As shown in FIG. 3, the ring gear 26 is arranged around the plurality of planetary gears 23. The ring gear 26 has an annular shape. The ring gear 26 has an inner peripheral surface where the tooth surface 26a is formed, the tooth surface 26a having helical teeth that mesh with the helical teeth 23b of the planetary gears 23. The ring gear 26 is fixed to the housing 29 via the fixing member 27.

The fixing member 27 is annular. The fixing member 27 is arranged on the outer peripheral side of the ring gear 26. The fixing member 27 is fixed to the housing 29. The fixing member 27 is in mesh with the teeth arranged on the outer periphery of the ring gear 26.

The output shaft 28 is arranged coaxially with the input shaft 21 (on the central axis O). The output shaft 28 is in mesh with the planetary carrier 25 by spline teeth. The output shaft 28 is rotatably supported with respect to the housing 29 by a plurality of bearings 55 arranged on the housing 29. The planetary carrier 25 and the second carrier disk 32 each have a through-hole along the axis O. The output shaft 28 is positioned in these through-holes and fixed to the second carrier disk 32 and the second carrier boss 35.

The housing 29 accommodates the sun gear 22, the plurality of planetary gears 23, the pinion shafts 24, the planetary carrier 25, the ring gear 26, and the fixing member 27. The input shaft 21 and the output shaft 28 are positioned in the housing 29.

As shown in FIG. 3, the housing 29 includes a first support portion 41, a second support portion 42, a third support portion 43, and a fourth support portion 44.

The first support portion 41 is arranged to the second-direction A2 side of the first carrier disk 31. The first support portion 41 has a wall portion 411 and a protruding portion 412. The wall portion 411 is arranged parallel to the first carrier disk 31. The wall portion 411 is arranged around the first carrier boss 34. The protruding portion 412 protrudes from the wall portion 411 in the second direction A2. The protruding portion 412 has a through-hole where the input shaft 21 is placed. The bearing 51 is arranged between the input shaft 21 and the inner wall of the through-hole of the protruding portion. With this configuration, the housing 29 rotatably supports the input shaft 21. The wall portion 411 has a through-hole along the axis O. The first carrier boss 34 is positioned in the through-hole. The bearing 53 is arranged between the first carrier boss 34 and the inner wall of the through-hole of the wall portion 411. With this configuration, the first support portion 41 rotatably supports the first carrier boss 34.

The second support portion 42 is arranged so as to cover the second carrier disk 32 on the first-direction A1 side and the ring gear 26 on the radially outer side. The second support portion 42 has a wall portion 421 and an outer edge portion 422. The wall portion 421 is arranged to the first-direction A1 side of the second carrier disk 32. The wall portion 421 has a through-hole along the axis O. The second carrier boss 35 is positioned in this through-hole. The second support portion 42 rotatably supports the second carrier boss 35. The bearing 54 is arranged between the second carrier boss 35 and the inner wall of the through-hole of the wall portion 421.

The outer edge portion 422 extends from the outer peripheral end of the wall portion 421 in the second direction A2. The end of the outer edge portion 422 in the second direction A2 is connected to the outer peripheral portion of the wall portion 411.

The first support portion 41 rotatably supports the first carrier boss 34, and the second support portion 42 rotatably supports the second carrier boss 35, and thereby the planetary carrier 25 is rotatably supported by the housing 29.

The third support portion 43 is disposed to the first-direction A1 side of the second support portion 42. The third support portion 43 is fixed to the second support portion 42. The third support portion 43 has a through-hole along the axis O. The output shaft 28 is positioned in the through-hole. The plurality of bearings 55 are arranged between the inner wall of the through-hole and the output shaft 28. With this configuration, the third support portion 43 rotatably supports the output shaft 28.

The fourth support portion 44 is disposed to the first-direction A1 side of the third support portion 43. The fourth support portion 44 is fixed to the third support portion 43. The fourth support portion 44 has a through-hole along the axis O. The output shaft 28 is positioned in the through-hole.

(Supply Paths 61-64)

Next, supply paths 61 to 64 configured to supply lubricating oil to the sun gear 22, the planetary gears 23, and the ring gear 26 will be described below. As shown in FIG. 3, the planetary gear mechanism 11 further includes the supply paths 61 to 64.

The supply path 61 is arranged to the second-direction A2 side of the sun gear 22. The supply path 61 is configured to discharge lubricating oil toward the tooth surface 22a of the sun gear 22. The supply path 61 is arranged in the input shaft 21. As shown in FIG. 4, the supply path 61 includes a first portion 611, plural second portions 612, and plural third portions 613.

The first portion 611 is arranged along the central axis of the main body 111 of the input shaft 21. The plural second portions 612 extend radially outward from the end of the first portion 611 in the first direction A1. The third portions 613 extend in the first direction A1 from the radially outer end of each of the second portions 612, and have openings 61a at the end surface 111a of the main body 111. The openings 61a are arranged to face the helical teeth 22b of the sun gear 22 in the direction along the axis O, as shown in FIG. 4. The openings 61a are arranged so as to overlap the tooth surface 22a when viewed along the first direction A1.

Figure 12A:
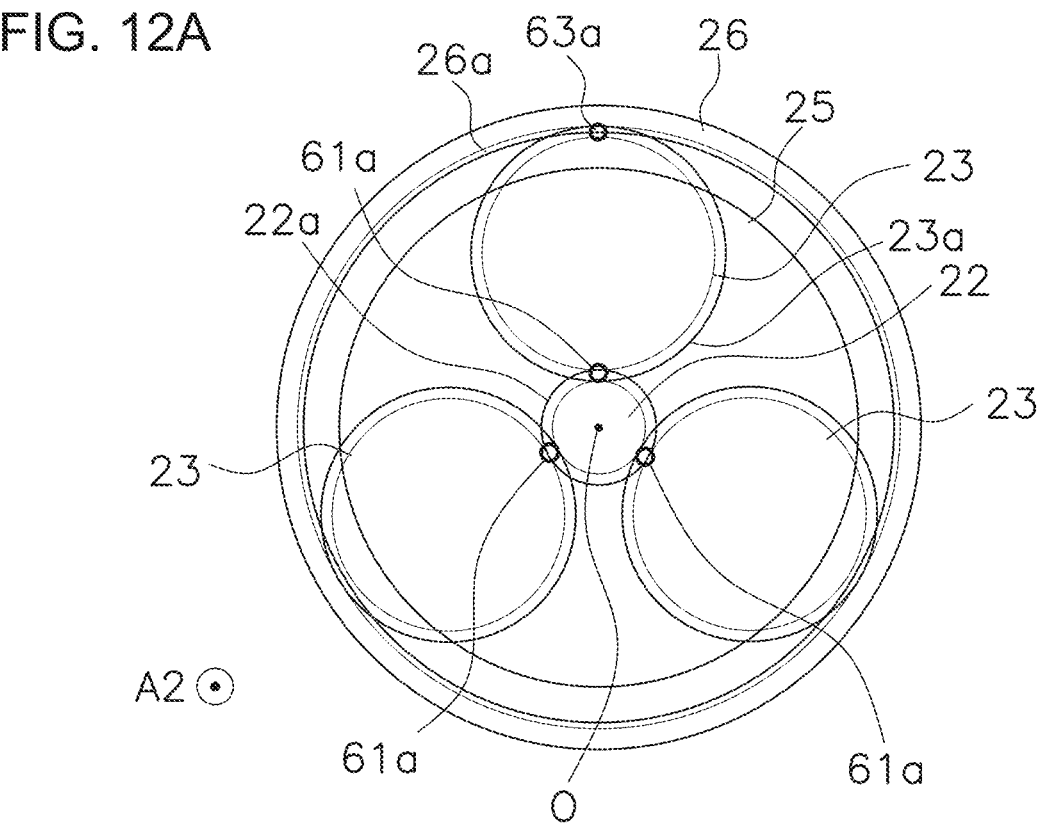
FIG. 12A is a diagram provided as a schematic view showing a positional relationship between an opening for discharging lubricating oil and gears when a planetary gear mechanism is viewed along a first direction.
Figure 12B:
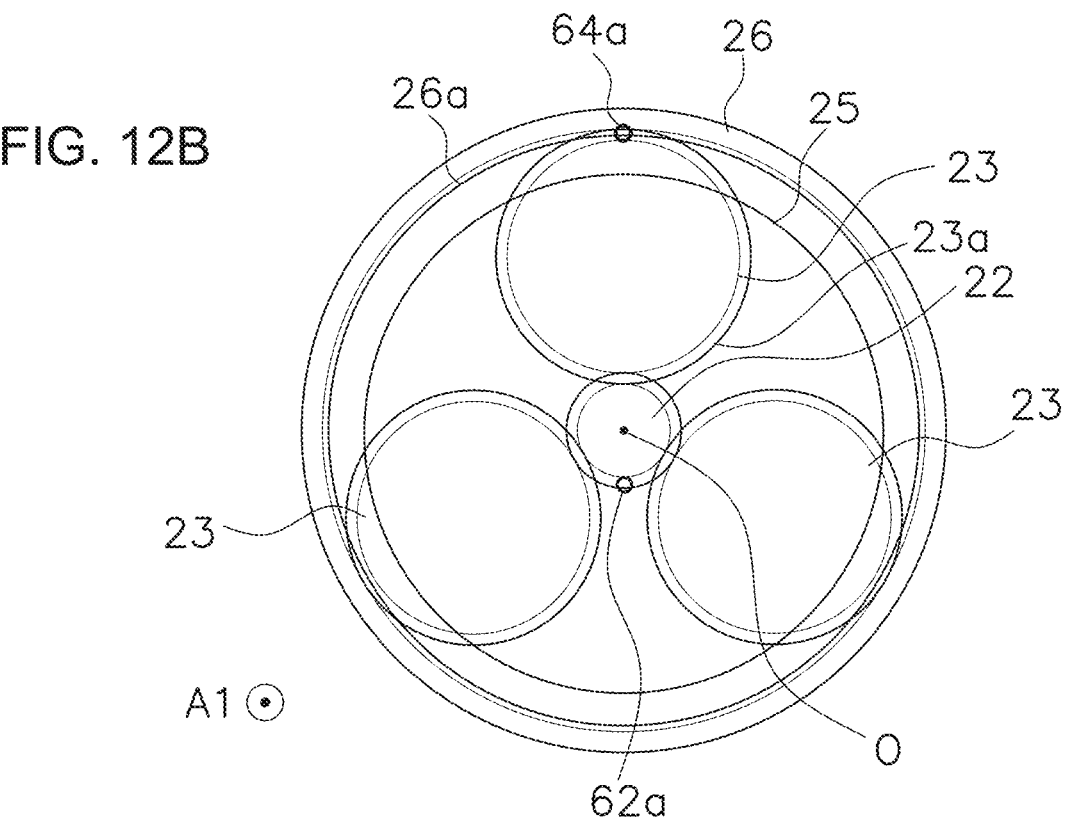
FIG. 12B is a diagram provided as a schematic view showing a positional relationship between an opening for discharging lubricating oil and gears when a planetary gear mechanism is viewed along a second direction.

FIG. 12A is a schematic diagram showing the positional relationship between the openings for discharging lubricating oil and the gears when the planetary gear mechanism 11 is viewed along the first direction A1. In FIG. 12A and FIG. 12B which will be described later, the openings are shown enlarged for clarity. As shown in FIG. 12A, the plural openings 61a of the third portions 613 are arranged along the circumferential direction around the axis O. The openings 61a are arranged at equal intervals around the axis O. The number of openings 61a is set to be the same as the number of the planetary gears 23. The lubricating oil supplied from the first portion 611 in the first direction A1 is divided into the plurality of second portions 612, passes through the third portions 613, and is discharged through the plural openings 61a toward the tooth surface 22a.

The supply path 62 is arranged to the first-direction A1 side of the sun gear 22, as shown in FIG. 3. The supply path 62 is configured to discharge lubricating oil toward the tooth surface 22a of the sun gear 22. The supply path 62 is arranged in the output shaft 28 and the housing 29, as shown in FIG. 3. The supply path 62 includes a first portion 621, a second portion 622, a third portion 623, a fourth portion 624, a fifth portion 625, and a sixth portion 626.

The first portion 621 is arranged on the fourth support portion 44. The first portion 621 extends from the outer surface of the fourth support portion 44 to the output shaft 28. The second portion 622 is a groove formed on the outer peripheral surface of the output shaft 28 along the circumferential direction. The first portion 621 is connected to the second portion 622 which is a groove. The third portion 623 extends from the second portion 622 toward the central axis of the output shaft 28. The fourth portion 624 extends from the end of the third portion 623 on the center side to the vicinity of the end surface 28a of the output shaft 28 in the second direction A2, as shown in FIG. 4. The fifth portion 625 extends radially outward from the end of the fourth portion 624 in the second direction A2. The sixth portion 626 extends in the second direction A2 from the radially outer end of the fifth portion 625. The sixth portion 626 has opening 62a at the end surface 28a of the output shaft 28 in the second direction A2. The opening 62a is arranged to face the helical teeth 22b of the sun gear 22 in the direction along the axis O, as shown in FIG. 4. The opening 62a is arranged so as to overlap the tooth surface 22a when viewed along the second direction A2. FIG. 12B is a schematic diagram showing the positional relationship between the openings for discharging lubricating oil and the gears when the planetary gear mechanism 11 is viewed along the second direction A2. As shown in FIG. 12B, the opening 62a is arranged at one location on the end surface 28a of the output shaft 28.

The lubricating oil passes through the first portion 621, the second portion 622, the third portion 623, the fourth portion 624, the fifth portion 625, and the sixth portion 626, and is discharged through the opening 62a toward the tooth surface 22a.

As shown in FIG. 3, the supply path 63 is arranged to the second-direction A2 side of the ring gear 26. The supply path 63 is configured to discharge lubricating oil toward the tooth surface 26a of the ring gear 26. The supply path 63 is arranged in the housing 29. The supply path 63 is arranged on the wall portion 411 of the first support portion 41. The supply path 63 extends from the outer surface to the inner surface of the wall portion 411. The supply path 63 is arranged parallel to the axis O. The supply path 63 has an opening 63a at the inner surface of the wall portion 411. The opening 63a is arranged to face the helical teeth inside the ring gear 26 in the direction along the axis O. The opening 63a is arranged so as to overlap the tooth surface 26a when viewed along the first direction A1. As shown in FIG. 12A, one opening 63a is located, for example, at the top of the tooth surface 26a of the ring gear 26.

As shown in FIG. 3, the supply path 64 is arranged to the first-direction A1 side of the ring gear 26. The supply path 64 is configured to discharge lubricating oil toward the tooth surface 26a of the ring gear 26. The supply path 64 is arranged in the housing 29. The supply path 64 is arranged on the wall portion 421 of the second support portion 42. The supply path 64 extends from the outer surface to the inner surface of the second support portion 42. The supply path 64 has a first portion 641 and a second portion 642. The first portion 641 is arranged perpendicularly to the axis O and extends from the outer peripheral surface of the wall portion 421 toward the inside (in the direction of the axis O). The second portion 642 is arranged from the inner end of the first portion 641 toward the second direction A2. The second portion 642 has an opening 64a at the inner peripheral surface of the wall portion 421. The opening 64a is arranged to face the helical teeth inside the ring gear 26 in the direction along the axis O. The opening 64a faces the opening 63a in the direction along the axis O. The opening 64a is arranged so as to overlap the tooth surface 26a when viewed along the second direction A2. As shown in FIG. 12B, one opening 64a is located, for example, at the top of the tooth surface 26a of the ring gear 26.

(Switching Valve 13)

The switching valve 13 is configured to switch the supply path for supplying the lubricating oil sent from the pump 12 to the gears. As shown in FIG. 2, the pump 12 and the tank 16 are connected by a first pipeline 71. The switching valve 13 and the pump 12 are connected by a second pipeline 72. A third pipeline 73 and a fourth pipeline 74 are connected to the switching valve 13. The third pipeline 73 is connected to the supply path 61 and the supply path 63 of the planetary gear mechanism 11. The fourth pipeline 74 is connected to the supply path 62 and the supply path 64 of the planetary gear mechanism 11.

The switching valve 13 switches the connection destination of the second pipeline 72 between the third pipeline 73 and the fourth pipeline 74. When the second pipeline 72 and the third pipeline 73 are connected by the switching valve 13, lubricating oil is supplied to the supply path 61 and the supply path 63 of the planetary gear mechanism 11. When the second pipeline 72 and the fourth pipeline 74 are connected by the switching valve 13, lubricating oil is supplied to the supply path 62 and the supply path 64 of the planetary gear mechanism 11.

The planetary gear mechanism 11 and the tank 16 are connected by a fifth pipeline 75. As shown in FIGS. 2 and 3, the lubricating oil discharged from the planetary gear mechanism 11 is returned to the tank 16.

(Rotation Sensor 14)

The rotation sensor 14 detects information for determining the rotation direction of the sun gear 22. The rotation sensor 14 transmits the detected information to the controller 15. As the rotation sensor 14, for example, a rotary encoder can be used.

The information for determining the rotational direction of the sun gear 22 may also be the information on the rotational direction of the input shaft 21 or the output shaft

28, or the information on the position of a forward/reverse switching lever of the work machine 1. When the forward/reverse switching lever is in the forward position, the sun gear 22 can be determined to be rotating in a predetermined direction, and when the forward/reverse switching lever is in the reverse position, the sun gear 22 can be determined to be rotating in the opposite direction to the predetermined direction.

(Controller 15)

The controller 15 includes a processor such as a CPU. The processor is configured to execute processes for controlling the pump 12 and the switching valve 13. The controller 15 includes a storage device. The storage device includes a memory such as RAM or ROM, and an auxiliary storage device such as a hard disk drive (HDD) or a solid-state drive (SSD). The storage device stores data and programs for controlling the pump 12 and the switching valve 13.

The controller 15 controls the switching valve 13 based on the information detected by the rotation sensor 14. Upon receiving the detected information from the rotation sensor 14, the controller 15 determines the rotation direction of the sun gear 22, switches the switching valve 13 according to the determined rotation direction, and causes lubricating oil to be discharged through the supply path 61 and the supply path 63, or through the supply path 62 and supply path 64.

Figure 13B:
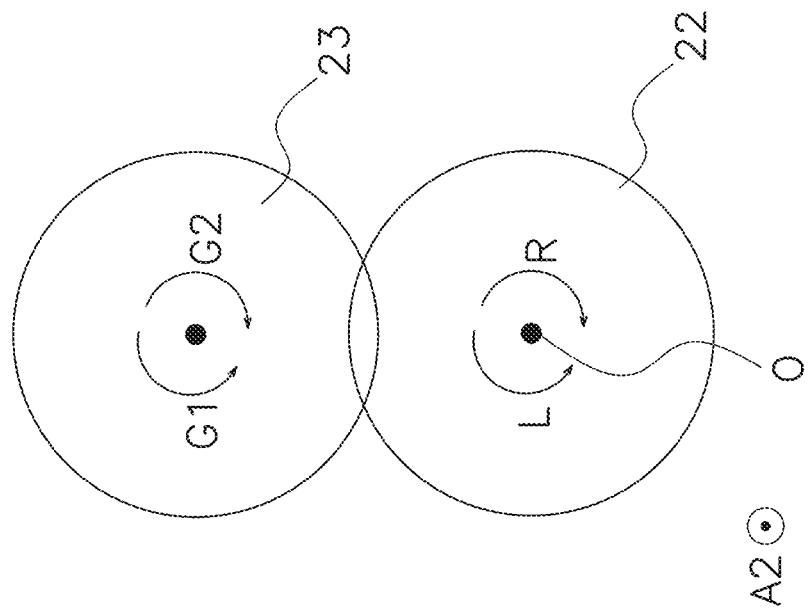
FIG. 13B is a diagram provided as a schematic view of the sun gear and the planetary gear viewed along the first direction.
Figure 13A:
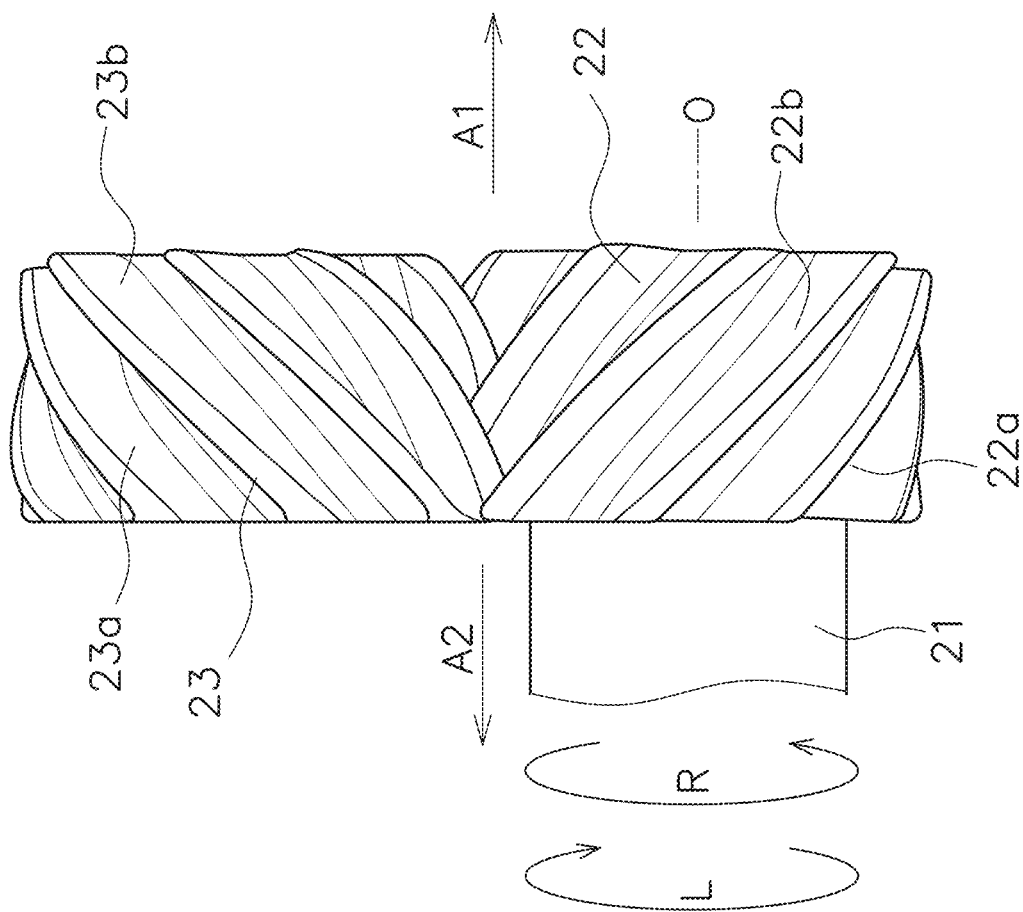
FIG. 13A is a diagram provided as a side schematic view showing a state in which the sun gear and a planetary gear are in mesh.

The rotation of helical-teeth gears and the flow of lubricating oil will be described below. FIG. 13A is a schematic side view showing a state in which the sun gear 22 and planetary gears 23 are in mesh with each other. For easier understanding, the sizes and shapes of the planetary gears 23 are different from those in FIG. 3. FIG. 13B is a schematic diagram of the sun gear 22 and the planetary gears 23 when viewed along the first direction A1.

When the sun gear 22 rotates in the left-hand rotation direction L shown in FIG. 13B, the plurality of planetary gears 23 rotates in a right-hand rotation direction G2. The shape of the helical teeth 22b of the sun gear 22 and the shape of the helical teeth 23b of the planetary gears 23 allow the lubricating oil to flow on the tooth surfaces 22a and 23a into the first direction A1 shown in FIG. 13A. The lubricating oil flows from the side of the first end portions 331 toward the side of the second end portions 332 of the carrier columns 33 shown in FIG. 7. As shown in FIG. 11, the lubricating oil flowing toward the side of the second end portions 332 is discharged through the flow paths S2 toward the outside of the planetary gear unit 20 as the planetary gears 23 rotate in the right-hand rotation direction G2. In FIG. 11, the direction in which the lubricating oil is discharged is indicated by thick arrows. The lubricating oil moves to the side of the second end portions 332 and is discharged through the flow paths S2 as the planetary gears 23 rotate, and thereby the lubricating oil mainly flows through the flow path portion S22 of the flow path S2. The flow path portion S22 is configured to have a wide distance d2 in the flow path S2, and the lubricating oil can be easily discharged, which therefore can reduce any rotation loss due to the lubricating oil. As described above, when the planetary gears 23 rotate in the right-hand rotation direction G2, the lubricating oil is discharged mainly through the flow path portion S22 on the side of the second end portions 332 in the flow path S2 on the right-circumferential-direction H2 side of each of the carrier column 33c, 33d, and 33e.

As shown in FIGS. 7 and 8, the flow path portion S21 of the flow path S2 is on the upstream side in the flow direction of the lubricating oil, and the amount of the lubricating oil flowing therethrough is small. Therefore, there is no need to widen the distance d2 of the flow path. The distance d2 of the flow path portion S21 is set to be narrower than that of the flow path portion S22, and thereby the cross-sectional areas of the carrier columns 33 can be increased and the strength of the planetary carrier 25 can be ensured. Furthermore, as shown in FIG. 11, when the planetary gears 23 rotate in the right-hand rotation direction G2, the portions of the planetary gears 23 facing the flow path S1 move toward the axis O, so that the lubricating oil does not flow toward the outside. Accordingly, the distance d1 of the flow path portion S11 of the flow path S1 is set to be narrow, and the cross-sectional areas of the carrier columns 33 are increased, which thereby ensures the strength of the planetary carrier 25.

In contrast, when the sun gear 22 rotates in the right-hand rotation direction R shown in FIG. 13B, the plurality of planetary gears 23 rotate in a left-hand rotation direction G1. The shape of the helical teeth 22b of the sun gear 22 and the shape of the helical teeth 23b of the planetary gears 23 allow the lubricating oil to flow on the tooth surfaces 22a and 23a into the second direction A2 shown in FIG. 13A. The lubricating oil flows from the second end portions 332 toward the first end portions 331 of the carrier columns 33 shown in FIG. 7. As shown in FIG. 9, the lubricating oil that has moved to the side of the first end portions 331 is discharged through the flow paths S1 toward the outside of the planetary gear unit 20 as the planetary gears 23 rotate in the left-hand rotation direction G1. In FIG. 9, the direction in which the lubricating oil is discharged is indicated by thick arrows. As shown in FIG. 9, the lubricating oil moves to the side of the first end portions 331 and is discharged through the flow paths S1 as the planetary gears 23 rotate, and thereby the lubricating oil mainly flows through the flow path portion S11 of the flow path S1. Since the flow path portion S1 is configured with the wide distance d1 in the flow path S1, the lubricating oil can be easily discharged, and therefore rotation loss due to the lubricating oil can be reduced.

As described above, when the planetary gears 23 rotate in the left-hand rotation direction G1, the lubricating oil is discharged mainly through the flow path portion S11 on the side of the first end portions 331 in the flow path S1 on the left-circumferential-direction H1 side of each of the carrier column 33c, 33d, and 33e.

As shown in FIGS. 7 and 8, the flow path portion S12 of the flow path S1 is on the upstream side in the flow direction of the lubricating oil, and the amount of the lubricating oil flowing therethrough is small. Therefore, there is no need to widen the distance d1 of the flow path. The distance d1 of the flow path portion S12 is set to be narrower than that of the flow path portion S11, and thereby the cross-sectional areas of the carrier columns 33 can be increased and the strength of the planetary carrier 25 can be ensured. Furthermore, as shown in FIG. 9, when the planetary gears 23 rotate in the left-hand rotation direction G1, the portions of the planetary gears 23 facing the flow path S2 move toward the axis O, so that the lubricating oil does not flow toward the outside. Accordingly, the distance d2 of the flow path portion S21 of the flow path S2 is set to be narrower than the distance d1 of the flow path portion S11, and the cross-sectional areas of the carrier columns 33 are increased, which thereby ensures the strength of the planetary carrier 25.

When the sun gear 22 rotates in the left-hand rotation direction L, the lubricating oil flows in the first direction A1. Therefore, the lubricating oil is supplied such that it is directed from the second-direction A2 side of the sun gear 22, which is upstream of the flowing direction, toward the first direction A1, which thereby enables constant supply of the lubricating oil onto the tooth surfaces 22a and 23a. Furthermore, when the sun gear 22 rotates in the right-hand rotation direction R, the lubricating oil flows in the second direction A2. Therefore, the lubricating oil is supplied such that it is directed from the first-direction A1 side of the sun gear 22, which is upstream of the flow direction, toward the second direction A2, which thereby enables constant supply of the lubricating oil onto the tooth surfaces 22a and 23a.

Note that, between the ring gear 26 and the planetary gears 23 also, when the sun gear 22 rotates in the left-hand rotation direction L, the lubricating oil flows in the first direction A1, and when the sun gear 22 rotates in the right-hand rotation direction R, the lubricating oil flows in the second direction A2.

Therefore, when the controller 15 determines that the rotation direction of the sun gear 22 is the left-hand rotation direction L based on the information detected by the rotation sensor 14, the controller 15 drives the switching valve 13 to connect the second pipeline 72 and the third pipeline 73. As a result, the lubricating oil supplied from the tank 16 by the pump 12 is discharged toward the tooth surface 22a of the sun gear 22 through the opening 61a of the supply path 61 that is disposed to the second-direction A2 side of the sun gear 22. Further, the lubricating oil supplied from the tank 16 by the pump 12 is discharged toward the tooth surface 26a of the ring gear 26 through the opening 63a of the supply path 63 that is disposed to the second-direction A2 side of the ring gear 26.

When the controller 15 determines that the rotation direction of the sun gear 22 is the right-hand rotation direction R based on the information detected by the rotation sensor 14, the controller 15 drives the switching valve 13 to connect the second pipeline 72 and the fourth pipeline 74. As a result, the lubricating oil supplied from the tank 16 by the pump 12 is discharged toward the tooth surface 22a of the sun gear 22 through the opening 62a of the supply path 62 that is disposed to the first-direction A1 side of the sun gear 22. Further, the lubricating oil supplied from the tank 16 by the pump 12 is discharged toward the tooth surface 26a of the ring gear 26 through the opening 64a of the supply path 64 that is disposed to the first-direction A1 side of the ring gear 26.

(Operation)

Figure 14:
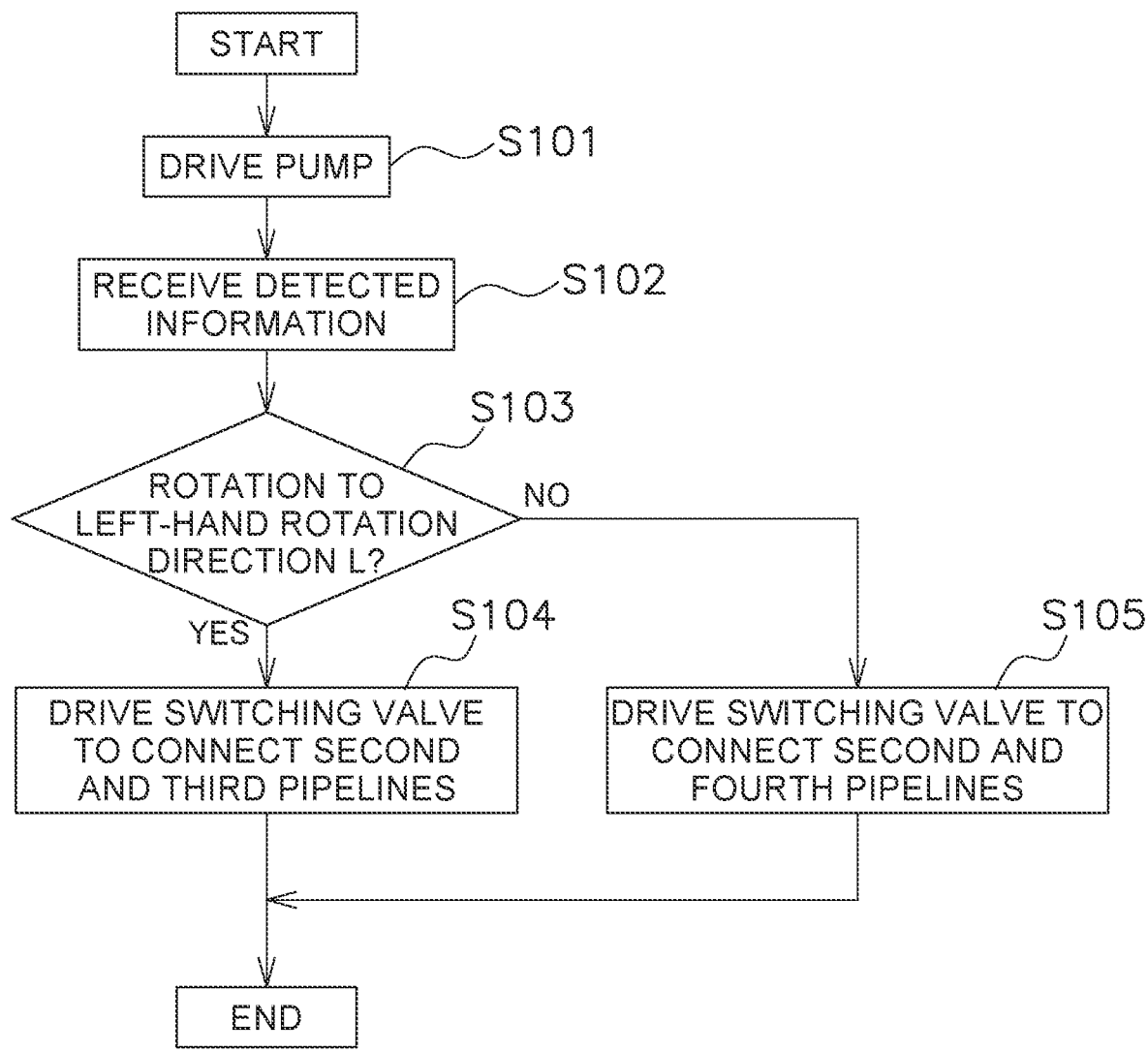
FIG. 14 is a flow diagram showing a control operation of the lubrication system

Next, the control operation of the lubrication system 10 of the present embodiment is described. FIG. 14 is a flow diagram showing the control operation of the lubrication system 10 of the present embodiment.

First, in Step S101, the controller 15 drives the pump 12.

Next, in Step S102, the controller 15 receives information detected by the rotation sensor 14.

In Step S103, then the controller 15 determines the rotation direction of the sun gear 22 based on the received detection information. For example, the controller 15 determines whether the rotation direction of the sun gear 22 is the left-hand rotation direction L, based on the detection information.

In Step S103, when it is determined that the rotation direction is the left-hand rotation direction L, the control proceeds to Step S104.

In Step S104, the controller 15 drives the switching valve 13 to connect the second pipeline 72 and the third pipeline 73, and the control ends. As a result, the lubricating oil supplied from the tank 16 by driving the pump 12 is discharged toward the tooth surface 22a of the sun gear 22 through the opening 61a of the supply path 61 that is located to the second-direction A2 side of the sun gear 22. The discharged lubricating oil flows in a direction from the side of the first end portions 331 to the side of the second end portions 332 (the first direction A1). As shown in FIG. 11, as the planetary gears 23 rotate in the right-hand rotation direction G2, the lubricating oil flowing toward the side of the second end portion 332 mainly passes through the flow path portion S22 of the flow path S2 and is discharged to the outside of the planetary gear unit 20.

Further, the lubricating oil supplied from the tank 16 by driving the pump 12 is discharged toward the tooth surface 26a of the ring gear 26 through the opening 63a of the supply path 63 that is disposed to the second-direction A2 side of the ring gear 26.

The lubricating oil discharged to the outside of the planetary gear unit 20 and the lubricating oil discharged through the opening 63a are returned to the tank 16 from inside the housing 29 through the fifth pipeline 75.

In contrast, in Step S103, when it is determined that the rotation direction is not the left-hand rotation direction L, the rotation direction can be determined to be the right-hand rotation direction R, and the control proceeds to Step S105.

In Step S105, the controller 15 drives the switching valve 13 to connect the second pipeline 72 and the fourth pipeline 74, and the control ends. As a result, the lubricating oil supplied from the tank 16 by driving the pump 12 is discharged toward the tooth surface 22a of the sun gear 22 through the opening 62a of the supply path 62 that is disposed to the first-direction A1 side of the sun gear 22. The discharged lubricating oil flows in a direction from the side of the second end portions 332 to the side of the first end portions 331 (the second direction A2). As shown in FIG. 9, as the planetary gears 23 rotate in the left-hand rotation direction G1, the lubricating oil flowing toward the side of the first end portions 331 mainly passes through the flow path portion S11 of the flow path S1 and is discharged to the outside of the planetary gear unit 20.

The lubricating oil supplied from the tank 16 by driving the pump 12 is discharged toward the tooth surface 26a of the ring gear 26 through the opening 64a of the supply path 64 that is disposed to the first-direction A1 side of the ring gear 26.

The lubricating oil discharged to the outside of the planetary gear unit 20 and the lubricating oil discharged through the opening 64a are returned to the tank 16 from inside the housing 29 through the fifth pipeline 75.

Note that the rotation sensor 14 constantly detects information regarding the rotation direction of the sun gear 22 and sends it to the controller 15. Therefore, the rotation direction is determined every time detection information is received. For example, when the rotation direction of the sun gear 22 determined based on the previous detection information matches the rotation direction of the sun gear 22 determined based on the present detection information, the controller 15 is able to maintain the current state, without driving the switching valve 13.

(Features and Others)

(1)

The planetary gear mechanism 11 of the present embodiment includes the plurality of planetary gears 23, the sun gear 22, the ring gear 26, the plurality of pinion shafts 24 (an example of a shaft), the first carrier disk 31 (an example of a first support wall), the second carrier disk 32 (an example of a second support wall), and the plurality of carrier columns 33 (an example of connecting sections). The plurality of planetary gears 23 each have helical teeth 23b. The sun gear 22 is arranged inside the plurality of planetary gears 23 to be in mesh with the plurality of planetary gears 23. The ring gear 26 is arranged outside the plurality of planetary gears 23 to be in mesh with the plurality of planetary gears 23. The plurality of pinion shafts 24 rotatably supports the plurality of planetary gears 23. The first carrier disk 31 supports the first ends 241 of the plurality of pinion shafts 24. The second carrier disk 32 supports second ends 242 opposite to the first ends 241 of the plurality of pinion shafts 24, and is disposed opposite to the first carrier disk 31. The plurality of carrier columns 33 is arranged between the planetary gears 23 adjacent in the circumferential direction H, and connects the first carrier disk 31 and the second carrier disk 32. The carrier columns 33 each have the first end portion 331 to be connected to the first carrier disk 31 and the second end portion 332 to be connected to the second carrier disk 32. The carrier columns 33 are arranged such that the distance d1 between the carrier columns 33 and the planetary gears 23 disposed to the left-circumferential-direction H1 side of the carrier columns 33 in the circumferential direction H is wider on the side of the first end portions 331 than on the side of the second end portions 332.

As described above, the carrier columns 33 are arranged such that the distance d1 to the planetary gears 23 on the left-circumferential-direction H1 side is wider on the side of the first end portions 331 than on the side of the second end portions 332. When the planetary gears 23 rotate in the left-hand rotation direction G1, the lubricating oil flows from the side of the second end portions 332 toward the side of the first end portions 331. Therefore, the distance d1 between the carrier columns 33 and the planetary gears 23 can be widened downstream of the flow direction of the lubricating oil, thereby facilitating the discharge of lubricating oil and reducing rotation loss due to the lubricating oil. Further, the amount of lubricating oil is smaller upstream of the flow direction of the lubricating oil, and there is no need to widen the distance d1 of the flow path S1. Accordingly, the cross-sectional areas of the carrier columns 33 can be increased, and the strength of the planetary carrier 25 can be ensured.

(2)

In the planetary gear mechanism 11 of the present embodiment, when the planetary gears 23 rotate in the left-hand rotation direction G1 (an example of a predetermined direction), lubricating oil flows, from the side of the second end portions 332 toward the side of the first end portions 331, between the carrier columns 33 and the planetary gears 23 that are disposed to the left-circumferential-direction H1 side (an example of a first circumferential-direction side) of the carrier columns 33.

With this configuration, the distance d1 between the carrier columns 33 and the planetary gears 23 can be widened downstream of the flow direction of the lubricating oil, thereby facilitating the discharge of the lubricating oil, and reducing rotation loss due to the lubricating oil.

(3)

In the planetary gear mechanism 11 of the present embodiment, the carrier columns 33 are arranged such that the distance d2 to the planetary gears 23 disposed to the right-circumferential-direction H2 side (an example of a second circumferential-direction side) is wider on the side of the second end portions 332 than on the side of the first end portions 331.

With this configuration, when the planetary gears 23 rotate in the right-hand rotation direction G2 which is opposite to the left-hand rotation direction G1, the distance d2 between the carrier columns 33 and the planetary gears 23 can be widened downstream of the flow direction of the lubricating oil, thereby facilitating the discharge of the lubricating oil, and reducing rotation loss due to the lubricating oil. Moreover, since the amount of the lubricating oil is smaller upstream of the flow direction of lubricating oil, there is no need to widen the distance d2 of the flow path S2. Therefore, the cross-sectional areas of the carrier columns 33 can be increased, and the strength of the planetary carrier 25 can be ensured.

(4)

In the planetary gear mechanism 11 of the present embodiment, the first end portions 331 of the carrier columns 33 are arranged such that the distance d1 to the planetary gears 23 that are disposed to the left-circumferential-direction H1 side in the circumferential direction H of the carrier columns 33 is wider than the distance d2 to the planetary gears 23 that are disposed to the right-circumferential-direction H2 side of the carrier columns 33, wherein the right circumferential direction is opposite to the left circumferential direction H1.

As described above, the first end portions 331 of the carrier columns 33 are arranged such that the distance d1 to the planetary gears 23 that are disposed to the left-circumferential-direction H1 side is wider than the distance d2 to the planetary gears 23 that are disposed to the right-circumferential-direction H2 side. In the flow paths on both sides of the first end portions 331 in the circumferential direction H, the distance d1 is widened between the first end portions 331 and the planetary gears 23 in the flow path S1 through which the lubricating oil is discharged to the outside by the rotation of the planetary gears 23, thereby facilitating the discharge of lubricating oil and reducing rotation loss due to the lubricating oil. In addition, in the flow paths on both sides of the first end portions 331 in the circumferential direction H, the distance d2 is narrowed between the first end portions 331 and the planetary gears 23 in the flow path S2 through which the lubricating oil is unlikely to be discharged to the outside due to the rotation of the planetary gears 23. Accordingly, the cross-sectional areas of the carrier columns 33 can be increased, and the strength of the planetary carrier 25 can be ensured.

(5)

In the planetary gear mechanism 11 of the present embodiment, the second end portions 332 of the carrier columns 33 are arranged such that the distance d2 to the planetary gears 23 that is disposed to the right-circumferential-direction H2 side of the carrier columns 33 is wider than the distance d1 to the planetary gears 23 that is disposed to the left-circumferential-direction H1 side of the carrier columns 33.

As described above, in the flow paths on both sides of the second end portions 332 in the circumferential direction H, when the planetary gears 23 rotate in the right-hand rotation direction G2, which is opposite to the left-hand rotation direction G1, the distance d2 is widened between the carrier columns 33 and the planetary gears 23 in the flow path S2 through which the lubricating oil is discharged to the outside by the rotation of the planetary gears 23. Therefore, the lubricating oil can be efficiently discharged, and rotation loss due to the lubricating oil can be reduced. In addition, in the flow paths on both sides of the second end portions 332 in the circumferential direction H, the distance d1 is narrowed between the second end portions 332 and the planetary gears 23 in the flow path S1 through which the lubricating oil is unlikely to be discharged to the outside by the rotation of the planetary gears 23. As a result, the cross-sectional areas of the carrier columns 33 can be increased, and the strength of the planetary carrier 25 can be ensured.

(6)

The planetary gear mechanism 11 of the present embodiment includes the plurality of planetary gears 23, the sun gear 22, the ring gear 26, the plurality of pinion shafts 24, the first carrier disk 31, the second carrier disk 32, and the plurality of carrier columns 33. The plurality of planetary gears 23 each have helical teeth 23b. The sun gear 22 is arranged inside the plurality of planetary gears 23 to be in mesh with the plurality of planetary gears 23. The ring gear 26 is arranged outside the plurality of planetary gears 23 to be in mesh with the plurality of planetary gears 23. The plurality of pinion shafts 24 rotatably support the plurality of planetary gears 23. The first carrier disk 31 supports the first ends 241 of the plurality of pinion shafts 24. The second carrier disk 32 supports the second ends 242 of the plurality of pinion shafts 24 opposite to the first ends 241, and is disposed opposite to the first carrier disk 31. The plurality of carrier columns 33 are arranged between the planetary gears 23 adjacent in the circumferential direction H, and connect the first carrier disk 31 and the second carrier disk 32. The carrier columns 33 each have the first end portion 331 to be connected to the first carrier disk 31 and the second end portion 332 to be connected to the second carrier disk 32. The first end portions 331 of the carrier columns 33 are arranged such that the distance d1 to the planetary gears 23 that are disposed to the left-circumferential-direction H1 side in the circumferential direction H of the carrier columns 33 is wider than the distance d2 to the planetary gears 23 that are disposed to the right-circumferential-direction H2 side of the carrier columns 33, where the right circumferential direction H2 is opposite to the left circumferential direction H1.

As described above, the first end portions 331 of the carrier columns 33 are arranged such that the distance d1 to the planetary gears 23 that are disposed to the left-circumferential-direction H1 side is wider than the distance d2 to the planetary gears 23 that are disposed to the right-circumferential-direction H2 side. In the flow paths on both sides of the first end portions 331 in the circumferential direction H, the distance d1 is widened between the first end portions 331 and the planetary gears 23 in the flow path S1 through which the lubricating oil is discharged to the outside by the rotation of the planetary gears 23, thereby facilitating the discharge of lubricating oil and reducing rotation loss due to the lubricating oil. In addition, in the flow paths on both sides of the first end portions 331 in the circumferential direction H, the distance d2 is narrowed between the first end portions 331 and the planetary gears 23 in the flow path S2 through which the lubricating oil is unlikely to be discharged to the outside due to the rotation of the planetary gears 23. Accordingly, the cross-sectional areas of the carrier columns 33 can be increased, and the strength of the planetary carrier 25 can be ensured.

(7)

In the planetary gear mechanism 11 of the present embodiment, when the planetary gears 23 rotate in the left-hand rotation direction G1, the lubricating oil flows, from the side of the second end portions 332 toward the side of the first end portions 331, between the carrier columns 33 and the planetary gears 23 that are disposed to the left-circumferential-direction H1 side of the carrier columns 33.

As a result, the distance d1 between the carrier columns 33 and the planetary gears 23 can be widened downstream of the flow direction of the lubricating oil, thereby facilitating the discharge of the lubricating oil, and reducing rotation loss due to the lubricating oil.

Other Embodiments

One embodiment of the claimed invention has been described above. However, the claimed invention is not limited to the above embodiment, and various changes can be made without departing from the scope of the claimed invention. In particular, the multiple embodiments and modifications described in this specification can be arbitrarily combined as necessary.

(A)

In the above embodiment, the planetary gears 23 rotate in both the left-hand rotation direction G1 and the right-hand rotation direction G2, and both the flow path S1 and the flow path S2 are formed with different distances on the side of the first end portions 331 and the side of the second end portions 332. However, the claimed invention is not limited to this configuration. For example, when the planetary gears 23 usually rotate in the left-hand rotation direction G1 and less frequently in the right-hand rotation direction G2, the amount of lubricating oil passing through the flow path S2 is small. In this case, the flow path S2 may be formed such that the distance d2 is narrow and the distance on the side of the first end portions 331 and the distance on the side of the second end portions 332 may be set to the same length.

(B)

In the planetary gear mechanism 11 of the above embodiment, three planetary gears 23 and three carrier columns 33 are arranged, but the number is not limited to three, and the number may be four or more.

(C)

In the embodiment above, the ring gear 26 is fixed to the housing 29, the sun gear 22 and the planetary gears 23 rotate relative to the housing 29, and power is input to the sun gear 22 and output from the planetary carrier 25. However, the claimed invention is not limited to this configuration. For example, a configuration is possible in which the planetary carrier 25 is fixed to the housing 29, the sun gear 22 and the ring gear 26 rotate, and power is output from the ring gear.

(D)

In the above embodiment, the distance d1 of the flow path S1 gradually widens from the side of the second end portions 332 to the side of the first end portions 331. However, the claimed invention is not limited to this configuration, and the distance d1 may be widened in stages. Similarly, the distance d2 of the flow path S2 gradually widens from the side of the first end portions 331 to the side of the second end portions 332. However, the claimed invention is not limited to this configuration, and the distance d2 may be widened in stages.

(E)

The work machine 1 of the above embodiment may be a wheel loader and a forklift equipped with front and rear tires, for example, but are not limited thereto, and may be an excavator and a bulldozer, and the like that are equipped with crawler belts.

According to the present disclosure, a planetary gear mechanism can be provided in which lubricating oil can be easily discharged and the strength can be ensured.

The invention claimed is:

1. A planetary gear mechanism comprising:
a plurality of planetary gears with helical teeth;
a sun gear disposed inside the plurality of planetary gears to mesh with the plurality of planetary gears;
a ring gear disposed outside the plurality of planetary gears to mesh with the plurality of planetary gears;

a plurality of shafts rotatably supporting the plurality of planetary gears;

a first support wall supporting first ends of the plurality of shafts;

a second support wall supporting second ends opposite to the first ends of the plurality of shafts, the second support wall being disposed opposite to the first support wall; and a plurality of connecting sections arranged between the planetary gears adjacent in a circumferential direction, the plurality of connecting sections connecting the first support wall and the second support wall, the connecting sections each including a first end portion connected to the first support wall and a second end portion connected to the second support wall, the connecting sections being arranged such that a distance between the connecting sections and the planetary gears disposed to a first-circumferential-direction side of the connecting sections in the circumferential direction is wider on a side of the first end portions than on a side of the second end portions, and the connecting sections being arranged such that a distance between the connecting sections and the planetary gears that are disposed to a second-circumferential-direction side is wider on the side of the second end portions than on the side of the first end portions, the second circumferential direction being opposite to the first circumferential direction.

2. The planetary gear mechanism according to claim 1, wherein when the planetary gears rotate in a predetermined direction, lubricating oil flows, from the side of the second end portions toward the side of the first end portions, between the connecting sections and the planetary gears that are disposed to the first-circumferential-direction side of the connecting sections.

3. The planetary gear mechanism according to claim 1, wherein the first end portions of the connecting sections are arranged such that a distance between the first end portions and the planetary gears disposed to the first-circumferential-direction side of the connecting sections is wider than a distance between the first end portions and the planetary gears disposed to the second-circumferential-direction side of the connecting sections.

4. The planetary gear mechanism according to claim 1, wherein the second end portions of the connecting sections are arranged such that a distance between the second end portions and the planetary gears disposed to the second-circumferential-direction side of the connecting sections is wider than a distance between the second end portions and the planetary gears disposed to the first-circumferential-direction side of the connecting sections.

5. A planetary gear mechanism comprising:
a plurality of planetary gears with helical teeth;
a sun gear disposed inside the plurality of planetary gears to mesh with the plurality of planetary gears;
a ring gear disposed outside the plurality of planetary gears to mesh with the plurality of planetary gears;
a plurality of shafts rotatably supporting the plurality of planetary gears;
a first support wall supporting first ends of the plurality of shafts;
a second support wall supporting second ends opposite to the first ends of the plurality of shafts, the second support wall being disposed opposite to the first support wall; and
a plurality of connecting sections arranged between the planetary gears adjacent in a circumferential direction, the plurality of connecting sections connecting the first support wall and the second support wall,
the connecting sections each including a first end portion connected to the first support wall and a second end portion connected to the second support wall,
the first end portions of the connecting sections being arranged such that
a distance between the first end portions and the planetary gears disposed to a first-circumferential-direction side of the connecting sections in the circumferential direction is wider than
a distance between the first end portions and the planetary gears disposed to a second-circumferential-direction side of the connecting sections,
the second circumferential direction being opposite to the first circumferential direction.

6. The planetary gear mechanism according to claim 5, wherein when the planetary gears rotate in a predetermined direction, lubricating oil flows, from the side of the second end portions toward the side of the first end portions, between the connecting sections and the planetary gears that are disposed to the first-circumferential-direction side of the connecting sections.

* * * * *